US012586941B2

(12) United States Patent
Yang et al.

(10) Patent No.: US 12,586,941 B2
(45) Date of Patent: Mar. 24, 2026

(54) FIELD INSTALLABLE CARD EDGE CONNECTOR

(71) Applicant: Amphenol Commercial Products (Chengdu) Co., Ltd., Chengdu (CN)

(72) Inventors: Kui Yang, Chengdu (CN); Xiaodong Hu, Chengdu (CN); Yaohua Hou, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 381 days.

(21) Appl. No.: 18/101,998

(22) Filed: Jan. 26, 2023

(65) Prior Publication Data

US 2023/0238724 A1 Jul. 27, 2023

(30) Foreign Application Priority Data

Jan. 27, 2022 (CN) ......................... 202210097418.3
Jan. 27, 2022 (CN) ......................... 202220224390.0

(51) Int. Cl.
*H01R 12/73* (2011.01)
*H01R 12/70* (2011.01)
(Continued)

(52) U.S. Cl.
CPC ....... *H01R 12/737* (2013.01); *H01R 12/7058* (2013.01); *H01R 13/115* (2013.01); *H01R 13/40* (2013.01)

(58) Field of Classification Search
CPC .............. H01R 12/737; H01R 12/7058; H01R 13/115; H01R 13/40; H01R 13/41;
(Continued)

(56) References Cited

U.S. PATENT DOCUMENTS 3,573,706 A 4/1971 Haberlen
3,970,353 A 7/1976 Kaufman
(Continued)

FOREIGN PATENT DOCUMENTS

CN 1175101 A 3/1998
CN 202633554 U 12/2012
(Continued)

OTHER PUBLICATIONS

Machine Translation TW 1678030 B (Nov. 21, 2019) (Year: 2025).*
(Continued)

*Primary Examiner* — Travis S Chambers
(74) *Attorney, Agent, or Firm* — Wolf, Greenfield & Sacks, P.C.

(57) ABSTRACT

A field installable connector that conforms to standard physical requirements while providing high performance at high speeds. The connector includes a housing holding conductive elements configured for pressure mount to a printed circuit board. The housing has a mating surface, a mounting surface opposite the mating surface in a vertical direction, and a slot extending through the mating surface. Each conductive element has a mating end curving into the slot, and a mounting end extending out of the mounting surface at an angle to the vertical direction. The mounting end has a contact surface configured to make contact with a contact pad on the board. The housing includes holes aligned with holes of the board such that a connecting member can extend through the aligned holes to secure the housing to the board and provide force for sufficient contact between conductive elements and respective contact pads.

20 Claims, 17 Drawing Sheets

(51) Int. Cl.
*H01R 13/115* (2006.01)
*H01R 13/40* (2006.01)

(58) Field of Classification Search
CPC .... H01R 12/57; H01R 12/714; H01R 12/721; H01R 13/2464; G06F 13/409; G06F 13/16
See application file for complete search history.

(56) References Cited

U.S. PATENT DOCUMENTS

| | | | | |
|---|---|---|---|---|
| 4,487,468 | A | 12/1984 | Fedder et al. | |
| 4,734,041 | A | 3/1988 | Bruchmann et al. | |
| 5,393,247 | A | 2/1995 | DiOrazio et al. | |
| 5,580,257 | A | 12/1996 | Harwath | |
| 5,810,623 | A | 9/1998 | Regnier et al. | |
| 5,876,214 | A | 3/1999 | McHugh et al. | |
| 5,997,312 | A | 12/1999 | Ho et al. | |
| 6,050,852 | A * | 4/2000 | Wu | H01R 13/629 439/97 |
| 6,363,450 | B1 * | 3/2002 | Lash | G06F 1/188 439/59 |
| 6,638,105 | B1 | 10/2003 | Wu | |
| 6,645,012 | B2 | 11/2003 | Ito et al. | |
| 6,648,682 | B1 | 11/2003 | Wu | |
| 6,749,463 | B1 | 6/2004 | Fan | |
| 6,814,619 | B1 * | 11/2004 | Stokoe | H01R 13/6587 439/108 |
| 7,008,250 | B2 | 3/2006 | Shuey et al. | |
| 7,008,267 | B2 | 3/2006 | Fan | |
| 7,074,067 | B2 | 7/2006 | Yang et al. | |
| 7,207,815 | B1 * | 4/2007 | Ju | H01R 12/7029 439/159 |
| 7,607,949 | B2 | 10/2009 | Hsu | |
| 7,637,783 | B2 | 12/2009 | Sasaoka et al. | |
| 7,677,907 | B2 | 3/2010 | Guan et al. | |
| 7,731,541 | B1 | 6/2010 | Lee et al. | |
| 7,892,006 | B2 | 2/2011 | Guan et al. | |
| 7,972,171 | B2 | 7/2011 | Teh | |
| 8,142,207 | B1 | 3/2012 | Ljubijankic et al. | |
| 8,187,031 | B2 | 5/2012 | Li et al. | |
| 8,328,567 | B1 * | 12/2012 | Yang | H01R 12/7005 439/157 |
| 8,403,689 | B2 | 3/2013 | Li et al. | |
| 8,535,077 | B2 | 9/2013 | Shen et al. | |
| 9,166,317 | B2 * | 10/2015 | Briant | H01R 12/737 |
| 9,325,090 | B2 | 4/2016 | Shen et al. | |
| 9,431,734 | B2 | 8/2016 | Guo et al. | |
| 9,666,971 | B1 * | 5/2017 | Lai | H01R 12/721 |
| 9,685,723 | B2 | 6/2017 | Kee Mew | |
| 9,887,485 | B2 | 2/2018 | Lambie et al. | |
| 10,062,991 | B2 * | 8/2018 | Wang | H01R 12/52 |
| 10,103,476 | B1 | 10/2018 | Qiu et al. | |
| 10,125,929 | B2 * | 11/2018 | Lai | F21S 4/28 |
| 10,135,165 | B2 | 11/2018 | Zuo | |
| 10,224,653 | B2 | 3/2019 | Niu et al. | |
| D852,752 | S * | 7/2019 | Uchida | D13/147 |
| 10,720,730 | B2 * | 7/2020 | Wang | H01R 12/7029 |
| 10,741,944 | B2 | 8/2020 | Long | |
| 10,855,020 | B1 | 12/2020 | Phillips et al. | |
| 10,916,894 | B2 | 2/2021 | Kirk et al. | |
| 11,374,340 | B2 | 6/2022 | Tang | |
| 11,817,639 | B2 * | 11/2023 | Yi | H01R 12/724 |
| 2005/0042928 | A1 | 2/2005 | Yi et al. | |
| 2007/0173118 | A1 | 7/2007 | Chen | |
| 2010/0075538 | A1 | 3/2010 | Ohshida | |
| 2010/0081296 | A1 * | 4/2010 | Nishiyama | H01R 12/7005 439/59 |
| 2011/0021080 | A1 | 1/2011 | Kamiya et al. | |
| 2011/0065297 | A1 | 3/2011 | Guan et al. | |
| 2011/0136388 | A1 * | 6/2011 | Fu | H01R 12/732 439/637 |
| 2011/0275238 | A1 | 11/2011 | Iijima et al. | |
| 2012/0178274 | A1 | 7/2012 | Manickam | |
| 2012/0202387 | A1 | 8/2012 | McNamara | |
| 2013/0280926 | A1 | 10/2013 | Ono | |
| 2016/0020540 | A1 | 1/2016 | Shen et al. | |
| 2016/0118736 | A1 | 4/2016 | Hoyack et al. | |
| 2016/0190724 | A1 | 6/2016 | Mito | |
| 2016/0336667 | A1 | 11/2016 | Kee Mew | |
| 2017/0302031 | A1 | 10/2017 | Cheng et al. | |
| 2018/0198220 | A1 | 7/2018 | Sasame et al. | |
| 2019/0165518 | A1 | 5/2019 | Hsu et al. | |
| 2019/0173209 | A1 | 6/2019 | Lu et al. | |
| 2019/0173232 | A1 | 6/2019 | Lu et al. | |
| 2019/0199023 | A1 * | 6/2019 | Soh | H01R 12/7064 |
| 2020/0076131 | A1 * | 3/2020 | Hu | H01R 12/737 |
| 2020/0076135 | A1 | 3/2020 | Tang et al. | |
| 2020/0203867 | A1 | 6/2020 | Lu | |
| 2021/0288423 | A1 | 9/2021 | Guo et al. | |
| 2021/0351529 | A1 | 11/2021 | Yang et al. | |
| 2021/0376508 | A1 | 12/2021 | Hu | |
| 2022/0037828 | A1 | 2/2022 | Hu et al. | |
| 2022/0069496 | A1 | 3/2022 | Yi et al. | |
| 2022/0181809 | A1 * | 6/2022 | Xie | H01R 12/716 |
| 2022/0181811 | A1 | 6/2022 | Liu et al. | |
| 2022/0247107 | A1 | 8/2022 | Tang et al. | |
| 2023/0009609 | A1 | 1/2023 | Chen et al. | |
| 2024/0297451 | A1 * | 9/2024 | He | H01R 12/724 |

FOREIGN PATENT DOCUMENTS

| | | | | |
|---|---|---|---|---|
| CN | 203660106 | U | 6/2014 | |
| CN | 105703103 | A | 6/2016 | |
| CN | 108539464 | A | 9/2018 | |
| CN | 107768862 | B * | 7/2020 | |
| CN | 212874843 | U | 4/2021 | |
| CN | 214505858 | U | 10/2021 | |
| EP | 0820124 | A2 | 1/1998 | |
| GB | 227943 | A | 1/1925 | |
| TW | 200835073 | A | 8/2008 | |
| TW | M475740 | U | 4/2014 | |
| TW | 1678030 | B * | 11/2019 | |
| WO | WO 02/073819 | A2 | 9/2002 | |
| WO | WO-2011014676 | A1 * | 2/2011 | H01R 4/028 |

OTHER PUBLICATIONS

Machine Translation CN 107768862 B (Jul. 28, 2020) (Year: 2025).*

International Search Report and Written Opinion mailed Nov. 29, 2021 for International Application No. PCT/CN2021/114671.

International Prelminary Report on Patentability mailed Feb. 28, 2023 for International Application No. PCT/CN2021/114671.

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL:https://www.tomshardware.com/news/what-we-know-ddr5-ram,39079.html [last accessed Jul. 21, 2022].

He et al., Reliable, Robust Card Edge Connector, U.S. Appl. No. 18/133,601, filed Apr. 12, 2023.

Yang et al., Electrical Connector, U.S. Appl. No. 17/973,913, filed Oct. 26, 2022.

(56) References Cited

OTHER PUBLICATIONS

Yang et al., Electrical Connector, U.S. Appl. No. 17/988,330, filed Nov. 16, 2022.
Yang et al., Electrical Connector, U.S. Appl. No. 18/075,246, filed Dec. 5, 2022.

* cited by examiner

FIELD INSTALLABLE CARD EDGE CONNECTOR

RELATED APPLICATIONS

This application claims priority to and the benefit of Chinese Patent Application Serial Nos. 202220224390.0 and 202210097418.3, both filed on Jan. 27, 2022, both entitled "CARD EDGE CONNECTOR WITH PRESSURE MOUNT AND ELECTRONIC SYSTEM." The contents of these applications are incorporated herein by reference in their entirety.

FIELD

This application relates to electrical connectors, such as those used to interconnect electronic assemblies.

BACKGROUND

Card edge connectors are used widely in electrical systems. It is generally easier and more cost effective to manufacture components of an electrical system on several printed circuit boards (PCBs), and to connect the PCBs to other components of the electrical system using card edge connectors than to manufacture the electrical system as a single component. Sometimes, one PCB may be used as a main board or motherboard, while other PCBs in the system may be referred to as daughter boards or daughter cards that are connected to the motherboard by card edge connectors to interconnect these PCBs. In a computer, card edge connectors may be used on a motherboard to receive a memory card, a graphics card, or other PCBs that provide other functionalities.

One type of a card edge connector is a memory socket for receiving a memory card. The memory socket may be used, for example to interconnect a memory daughter card with a motherboard. DDR5 (Double Data Rate Gen 5) is a memory specification widely used in computers today. A daughter card using DDR5 may be interconnected with the motherboard of a computer through a card edge connector. The card edge connector is fixed on the motherboard, and conductive elements on the card edge connector are interconnected with circuits on the motherboard. The daughter card is inserted into the card slot of the card edge connector, so that the pads on the daughter card are electrically connected with corresponding conductive elements on the card edge connector, so as to provide electrical interconnection with circuitry on the motherboard through the card edge connector.

A known card edge connector includes a housing having a slot defined by two opposing side walls for receiving a daughter card. Each of the opposing side wall may include a row of openings exposing a plurality of conductive elements. A mating contact portion of a conductive element may extend into the slot through a corresponding opening in the side wall, such that when a daughter card is inserted into the slot, the conductive element may be electrically connected with a corresponding conductive pad on the daughter card via the contact portion. The card edge connector may also include an ejector for ejecting the daughter card and a lock for locking the daughter card in the slot.

Computers may be manufactured with multiple card edge connectors to receive multiple memory cards. Some computers may be manufactured with memory cards in all of those connectors. For cost reasons, other computers of the same design may be manufactured with memory cards in only some of the connectors. The user of those computers then has the option to later add memory cards where more performance from the computer is desired.

BRIEF SUMMARY

Aspects of the present disclosure relate to field installable card edge connectors.

Some embodiments relate to an electrical connector. The electrical connector may include a housing comprising a mating surface, a mounting surface separated from the mating surface in a vertical direction, and a slot extending through the mating surface and elongated in a longitudinal direction perpendicular to the vertical direction; and a plurality of conductive elements held in the housing, each of the plurality of conductive elements comprising a mating end curving into the slot, a mounting end extending out of the mounting surface and configured for pressure mount, and an intermediate portion joining the mating end and the mounting end.

Optionally, for each of the plurality of conductive elements: the mounting end may extend from the intermediate portion at an angle to the vertical direction; and the angle may be greater than zero degree and less than ninety degrees.

Optionally, the mounting end may comprise a contact surface perpendicular to the vertical direction.

Optionally, the contact surface may comprise a conductive layer.

Optionally, for each of the plurality of conductive elements: the mounting end may be thinner and/or narrower than the intermediate portion.

Optionally, for each of the plurality of conductive elements, the mounting end may be thinner than the mating end.

Optionally, for each of the plurality of conductive elements: the mating end may comprise a first curved portion and a second curved portion; the first curved portion may join the second curved portion and the intermediate portion; and the second curved portion may comprise a mating contact region in the slot.

Optionally, the housing may comprise a pair of towers disposed at opposite ends of the slot and a pair of latches pivotably attached to respective ones of the pair of towers; and each of the pair of towers may comprise a lug extending outwards of the slot and comprising a mounting hole extending therethrough.

Optionally, the housing may comprise another mounting hole disposed between the pair of towers.

Some embodiments relate to an electrical connector. The electrical connector may include a housing comprising a mating surface, a mounting surface separated from the mating surface in a vertical direction, and a slot extending through the mating surface and elongated in a longitudinal direction perpendicular to the vertical direction; a plurality of conductive elements held in the housing, each of the plurality of conductive elements comprising a mating end curving into the slot and a mounting end extending out of the mounting surface; and a member at least partially disposed on the housing and comprising a slot aligned with the slot of the housing.

Optionally, the member may comprise a pair of openings; and the housing may comprise a pair of towers disposed at opposite ends of the slot and extending through respective ones of the pair of openings and in the vertical direction.

Optionally, the housing may comprise one or more mounting holes; and the member may comprise one or more mounting holes aligned with respective ones of the one or more mounting holes of the housing.

Optionally, the one or more mounting holes of the member may comprise a first mounting hole disposed outside the pair of towers and a second mounting hole disposed between the pair of towers.

Optionally, the member may comprise a first portion disposed on the mating surface; and the first portion of the member may comprise the slot of the member.

Optionally, the member may comprise a second portion extending from the first portion and in the vertical direction.

Optionally, the member may comprise material stronger than material of the housing.

Some embodiments relate to an electronic system. The electronic system may include a printed circuit board comprising a memory bus; a first electrical connector electrically coupled to the memory bus; a second electrical connector disposed next to the first electrical connector and electrically coupled to the memory bus; and a connecting member holding both the first electrical connector and the second electrical connector to the printed circuit board.

Optionally, the connecting member may extend through a hole; the first electrical connector may comprise a first housing comprising a first portion of the hole; and the second electrical connector may comprise a second housing comprising a second portion of the hole.

Optionally, the first electrical connector may comprise a first housing and a first member at least partially disposed on the first housing; and the connecting member may hold the first member of the first electrical connector to the printed circuit board.

Optionally, the second electrical connector may comprise a second housing and a second member at least partially disposed on the second housing; and the connecting member may hold the second member of the second electrical connector to the printed circuit board.

Some embodiments relate to a card edge connector with pressure mount. The card edge connector with pressure mount may include an insulating housing and a plurality of conductive elements. The insulating housing may have a mating surface and a mounting surface opposite in a vertical direction, and a card slot through the mating surface. The plurality of conductive elements may be held in the insulating housing. Each of the plurality of conductive elements may have an mating end and a mounting end configured for pressure mount, the mating end may extend into the card slot, and the mounting end may extend out of the mounting surface for pressure mount to a contact pad on a circuit board.

Optionally, an insulating housing mounting hole may be formed in the insulating housing.

Optionally, a tower may be arranged at an end, in a longitudinal direction perpendicular to the vertical direction, of the insulating housing, the insulating housing mounting hole may comprise a first insulating housing mounting hole and/or a second insulating housing mounting hole, the first insulating housing mounting hole may be formed at the outer side of the tower in the longitudinal direction, and the second insulating housing mounting hole may be formed in the middle of the insulating housing in the longitudinal direction.

Optionally, the tower may be provided with a first lug, the first lug may extend along the mounting surface, and the first insulating housing mounting hole may be formed in the first lug.

Optionally, a latch may be pivotally connected to the tower, and the first lug may not extend beyond, in the longitudinal direction, the latch pivoted to an unlocked position.

Optionally, the second insulating housing mounting hole may be formed inside the insulating housing.

Optionally, the second insulating housing mounting hole may be formed on the side, extending in the longitudinal direction, of the insulating housing.

Optionally, the second insulating housing mounting hole may be half hole, the half hole may communicate with the external along a transverse direction in a cross section of the half hole, the transverse direction is perpendicular to the longitudinal direction and the vertical direction.

Optionally, the second insulating housing mounting hole may be configured to form a through hole with a second insulating housing mounting hole formed in an adjacent card edge connector with pressure mount to share a same connecting member.

Optionally, an insulating housing recess and a second lug may be arranged on the side, extending in the longitudinal direction, of the insulating housing; the second lug, adjacent to the mounting surface, may extend outward in the transverse direction from the interior of the insulating housing recess; and the second insulating housing mounting hole may be formed in the second lug, wherein the transverse direction is perpendicular to the longitudinal direction and the vertical direction.

Optionally, the card edge connector with pressure mount may further comprise a member. The member may be mounted on one side, on which the mating surface is located; a slot exposing the card slot may be formed in the member; and the member may be used for applying pressure to the insulating housing.

Optionally, the member may comprise a cover plate; the cover plate may cover the mating surface; and the slot may be formed in the cover plate.

Optionally, a flange, extending toward the mounting surface, may be arranged at the side edge of the cover plate and abut against the side surface of the insulating housing.

Optionally, the cover plate and the flange may be sized to provide the desired signal integrity and the desired robustness.

Optionally, a tower may be arranged at an end, in a longitudinal direction perpendicular to the vertical direction, of the insulating housing; a tower opening may be further formed in an end of the cover plate; and the tower may extend through the tower opening.

Optionally, the cover plate may comprise a first sub-cover plate and a second sub-cover plate; and the first sub-cover plate and the second sub-cover plate may be spaced apart from each other to form the tower opening and the slot.

Optionally, the cover plate may further comprise an end plate; the end plate may connect the first sub-cover plate and the second sub-cover plate on the outer side, in the longitudinal direction, of the tower; and a first stiffener mounting hole may be formed in the end plate.

Optionally, the end plate may be closer to the mounting surface rather than the mating surface.

Optionally, the insulating housing may be of an elongated structure; and a second stiffener mounting hole may be formed on the side, extending in the longitudinal direction, of the member.

Optionally, the second stiffener mounting hole may be a half hole, the half hole may communicate with the external along a transverse direction in a cross section of the half hole, and the transverse direction is perpendicular to the longitudinal direction and the vertical direction.

Optionally, the second stiffener mounting hole may be configured to form a through hole with a second stiffener mounting hole formed in a member of an adjacent card edge connector with pressure mount to share a same connecting member.

Optionally, a stiffener recess may be arranged on the side, extending in the longitudinal direction, of the insulating housing, a hole seat adjacent to the mounting surface may be formed inside the stiffener recess, and the second stiffener mounting hole may be formed in the hole seat.

Optionally, the member may be provided with a stiffener mounting hole aligned with the insulating housing mounting hole formed in the insulating housing.

Optionally, the member may be made of metal and used for grounding.

Optionally, the thickness of the mounting end is smaller than that of the mating end.

Optionally, an intermediate portion may be arranged between the mounting end and the mating end; and the thickness of the intermediate portion may be larger than that of the mounting end.

Optionally, an intermediate portion may be arranged between the mounting end and the mating end and may be fixed in the insulating housing; the mating end may comprise a V-shaped portion and a U-shaped portion; one end of the V-shaped portion may be connected to the intermediate portion and the other end may connected to an end of the U-shaped portion at the inner side of the intermediate portion; and a bend of the U-shaped portion may form a contact region.

Optionally, the mounting end may obliquely extend toward an outer side of the insulating housing.

Optionally, a tip may be connected to the end of the mating end and limited in a mounting groove for the conductive element having the tip thereon.

Optionally, the tip may be configured to be short enough that a distance between a contact region of the mating end bent in the card slot and an opening of the card slot is smaller than a preset distance.

Some embodiments relate to a card edge connector with pressure mount. The card edge connector with pressure mount may comprise an insulating housing having a mating surface and a mounting surface, wherein a card slot may be through the mating surface; a plurality of conductive elements may be held in the insulating housing, wherein each of the plurality of conductive elements may have a mating end and a mounting end, the mating end may extend into the card slot, and the mounting end may extend out of the mounting surface; and a member may be mounted on the insulating housing and used for applying pressure to the insulating housing to enable the mounting end to pressure mount to a contact pad on the circuit board.

Optionally, an insulating housing mounting hole may be formed in the insulating housing.

Optionally, a tower may be arranged at the end, in a longitudinal direction, of the insulating housing; the insulating housing mounting hole may comprise a first insulating housing mounting hole and/or a second insulating housing mounting hole; the first insulating housing mounting hole may be formed at the outer side of the tower in the longitudinal direction; and the second insulating housing mounting hole may be formed in the middle of the insulating housing in the longitudinal direction.

Optionally, the tower may be provided with a first lug; the first lug may extend along the mounting surface; and the first insulating housing mounting hole may be formed in the first lug.

Optionally, a latch may be pivotally connected to the tower; and a projection of the latch pivoted to an unlocked position on the mounting surface may cover a projection of the first lug on the mounting surface.

Optionally, the second insulating housing mounting hole may be formed inside the insulating housing.

Optionally, the second insulating housing mounting hole may be formed on the side, extending in the longitudinal direction, of the insulating housing.

Optionally, the second insulating housing mounting hole may be a half hole, the half hole may communicate with the external along a transverse direction in the cross section of the half hole, and the transverse direction is perpendicular to the longitudinal direction.

Optionally, the second insulating housing mounting hole may be configured to form a through hole with a second insulating housing mounting hole formed in an adjacent card edge connector with pressure mount to share a same connecting member.

Optionally, an insulating housing recess and a second lug may be arranged on the side, extending in the longitudinal direction, of the insulating housing; the second lug, adjacent to the mounting surface, may extend outward in the transverse direction from the interior of the insulating housing recess; and the second insulating housing mounting hole may be formed in the second lug, wherein the transverse direction is perpendicular to the longitudinal direction.

Optionally, the member may comprise a cover plate; the cover plate may cover the mating surface; and a slot may be formed in the cover plate.

Optionally, a flange, extending toward the mounting surface, may be arranged at the side edge of the cover plate and abut against the side surface of the insulating housing.

Optionally, the cover plate and the flange may be sized to provide the desired signal integrity and the desired robustness.

Optionally, a tower may be arranged at an end, in a longitudinal direction, of the insulating housing; a tower opening may be further formed in an end of the cover plate; and the tower may extend through the tower opening.

Optionally, the cover plate may comprise a first sub-cover plate and a second sub-cover plate; and the first sub-cover plate and the second sub-cover plate may be spaced apart from each other to form the tower opening and the slot.

Optionally, the cover plate may further comprise an end plate; the end plate may connect the first sub-cover plate and the second sub-cover plate on the outer side, in the longitudinal direction, of the tower; and the first stiffener mounting hole may be formed in the end plate.

Optionally, the end plate may be closer to the mounting surface rather than the mating surface.

Optionally, the insulating housing may be of an elongated structure; and a second stiffener mounting hole may be formed on the side, extending in the longitudinal direction, of the member.

Optionally, the second stiffener mounting hole may be a half hole, the half hole may communicate with the external along a transverse direction in a cross section of the half hole, and the transverse direction is perpendicular to the longitudinal direction.

Optionally, the second stiffener mounting hole may be configured to form a through hole with a second stiffener mounting hole formed in a member of an adjacent card edge connector with pressure mount to share a same connecting member.

Optionally, a stiffener recess may be arranged on the side, extending in the longitudinal direction, of the insulating housing; a hole seat adjacent to the mounting surface may be formed inside the stiffener recess; and the second stiffener mounting hole may be formed in the hole seat.

Optionally, the member may be provided with a stiffener mounting hole aligning with the insulating housing mounting hole formed in the insulating housing.

Optionally, the member may be made of metal and used for grounding.

Optionally, the thickness of the mounting end may be smaller than that of the mating end.

Optionally, an intermediate portion may be arranged between the mounting end and the mating end; and the thickness of the intermediate portion may be larger than that of the mounting end.

Optionally, the intermediate portion may be arranged between the mounting end and the mating end and may be fixed in the insulating housing; the mating end may comprise a V-shaped portion and a U-shaped portion; one end of the V-shaped portion may be connected to the intermediate portion and the other end may be connected to an end of the U-shaped portion at the inner side of the intermediate portion; and a bend of the U-shaped portion may form a contact region.

Optionally, the mounting end may obliquely extend toward an outer side of the insulating housing.

Optionally, a tip may be connected to the end of the mating end and may be limited in a mounting groove for the corresponding conductive element having the tip thereon.

Optionally, the tip may be configured to be short enough that a distance between a contact region of the mating end bent in the card slot and an opening of the card slot is smaller than a preset distance.

Some embodiments relate to an electronic system. The electronic system may comprise a circuit board and a card edge connector with pressure mount, wherein the card edge connector with pressure mount may comprise an insulating housing, a mounting surface of which may be connected to a front side of the circuit board; and a plurality of conductive elements held in the insulating housing, each of the plurality of conductive elements may have a mounting end, the mounting end may extend out of the mounting surface and may be used for pressure mount to a contact pad on the circuit board.

Optionally, the card edge connector with pressure mount may further comprise a member fixed on the circuit board, the insulating housing being clamped between the member and the circuit board.

Optionally, the electronic system may further comprise a circuit board stiffener fixed to the card edge connector with pressure mount, the circuit board being clamped between the card edge connector with pressure mount and the circuit board stiffener.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

Figure 1:
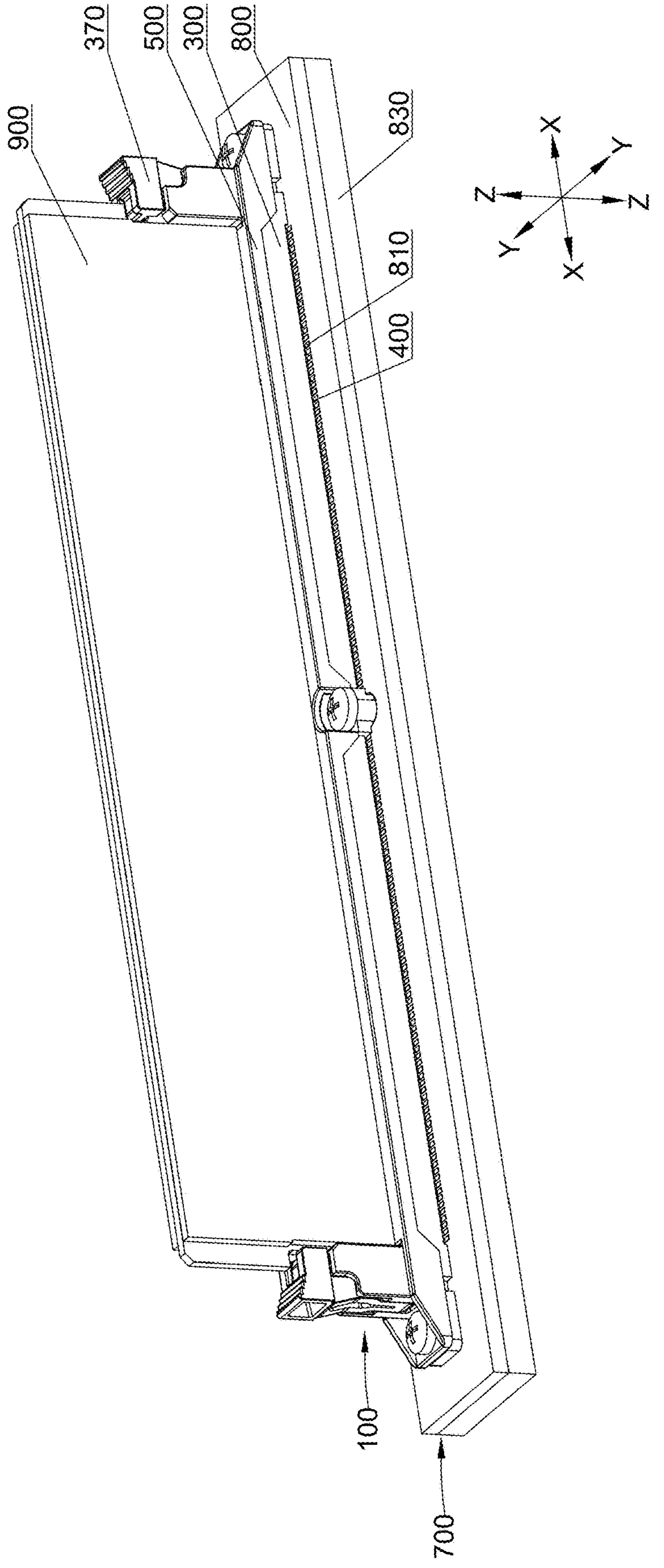
FIG. 1 is a perspective view of an electronic system, showing an electronic card inserted into a card edge connector mounted on a printed circuit board, according to some embodiments.

The above accompanying drawings include the following reference numerals:

card edge connector 100; reinforcing member 200; opening 201; transverse part 210; first longitudinal part 221; second longitudinal part 222; elastic part 230; first extension part 251; second extension part 252; first arc transition part 261; second arc transition part 262; first protrusion part 271; second protrusion part 272; third protrusion part 273; insulating housings 300, 300"; mating surface 301; mounting surface 302; side portion 310; first side portion 311; second side portion 312; tower 320; card slot 330; card inserting groove 331; card locking groove 332; separating rib 333; insulating housing mounting hole 340; first insulating housing mounting hole 341; second insulating housing mounting holes 342, 342"; insulating housing recess 350; first lug 361; second lug 362; latch 370; edge 371; slot 390; first step 391; second step 392; first recess 393; second recess 394; third recess 395; mounting groove 396; conductive element 400; mating end 410; V-shaped portion 411; U-shaped portion 412; contact region 413; mounting end 420; intermediate portion 430; tip 440; member 500; slot 510; cover plate 520; first sub-cover plate 521; second sub-cover plate 522; end plate 523; flange 530; tower opening 540; stiffener mounting hole 550; first stiffener mounting hole 551; second stiffener mounting hole 552; stiffener recess 560; hole seat 561; shell reinforcing separating rib 570; bolt 610; nut 620; electronic systems 700, 700'; circuit board 800; contact pad 810; circuit board mounting hole 820; circuit board stiffener 830; circuit board stiffener mounting hole 840; electronic card 900; and golden finger 910.

DETAILED DESCRIPTION

The Inventors have recognized and appreciated connector designs that may enable improved performance of computer systems that use high data rate buses to connect components to add-in-cards, such as memory cards. These connector designs may enable connectors that are field installable. Connectors manufactured according to these designs may synergistically support higher frequency connector operation, satisfy the physical requirements set by industry standards such as DDR5, and meet requirements for mass manufacturing, including cost, time and reliability.

Conventionally, unpopulated connectors are pre-installed on a computer motherboard in factories by, for example, soldering, so that additional cards may be added to the motherboard at a later time. The conductive elements of the unpopulated connector that are interconnected to signal paths on the motherboard can act as an unterminated stub. An unterminated stub can impact the signal integrity (SI) and electromagnetic interference (EMI) performance of the system. For example, a computer may be designed with a memory bus that transfers data between a processor and memories. Sockets may be attached to the bus at the time the computer is manufactured. Subsequently, if it is desired to add memory to the computer, memories on add-in-cards may be inserted into the sockets. If some sockets are not populated with add-in memory cards, a performance problem may arise. A conductive element of an unpopulated socket designed to receive a DDR5 memory card, for example, has a mating contact portion that extends a few mm (e.g., 6 mm) in length, which may cause stub resonance within the frequency range of high speed signals on the memory bus to which that socket is connected. Such undesirable electromagnetic characteristics in the operating frequency range of the memory bus may create a particular high risk of interfering with operation of the memory bus.

Aspects of the present disclosure provide high performance, high speed electrical connectors that can be installed in the field by users, which may replace pre-installed unpopulated connectors. Such a connector may include conductive elements configured for pressure mount to a printed circuit board, which may require no additional materials and/or special tools that may be found in factories but not usually possessed by users.

A housing may hold the conductive elements. The housing may have a mating surface, a mounting surface opposite the mating surface in a vertical direction, and a slot extending through the mating surface and elongated in a longitudinal direction perpendicular to the vertical direction. A pair of towers extending in the vertical direction may be disposed on opposite sides of the slot, which may extend into the towers. A pair of latches may be disposed in respective ones of the pair of towers and configured to pivot between a locked position for securing a card in the slot and an unlocked position for ejecting the card out of the slot.

The conductive elements may be disposed in rows on opposite sides of the slot. Each conductive element may include a mating end, a mounting end, and an intermediate portion joining the mating end and the mounting end. The mating end may include a curved portion extending into the slot so as to mate with a card inserted into the slot. The mounting end may extend out of the mounting surface at an angle to the vertical direction, which may change depending on the state of the conductive element. The conductive element may move from a rest state to a compressed state when making contact with a contact pad of a printed circuit board that the connector is mounted to. The angle may increase when the conductive element moves from the rest state to the compressed state, which may provide force for a sufficient contact between a contact surface of the conductive element and the contact pad.

The conductive elements may be configured to balance a tradeoff between a desired compression force and signal integrity performance. For each conductive element, the mounting end may be thinner and/or narrower than the intermediate portion, which may reduce the compression force. The mounting end may have a plating layer at least at selected locations such as the contact surface. The plating layer may include one or more of gold, tin, and any other suitable material, which may reduce a contact resistance between the contact surface of the conductive element and the contact pad and therefore improve signal integrity.

The housing may be configured to provide the compression force to the conductive element when the housing is secured to the printed circuit board that the connector is mounted to. The housing may have one or more mounting holes disposed at selected locations, which may be configured to align with respective holes of the printed circuit board. A connecting member such as a bolt may extend through the aligned holes so as to hold the housing to the printed circuit board. In some embodiments, the housing may include mounting holes disposed outside the pair of towers in the longitudinal direction. In some embodiments, the housing may include one or more holes disposed between the pair of towers. Some of the holes may be shaped to coordinate with holes of an adjacent connector such that the adjacent connectors may share a connecting member.

The inventors have recognized and appreciated that the housing may be subject to warpage when the housing is secured to the printed circuit board by a user. The connector may include a member configured to reduce the risk of housing warpage. The member may be made of a material that has higher strength such as metal, ceramic, or any other suitable materials. The member may be at least partially disposed on the mating surface of the housing and have a slot aligned with the slot of the housing so that a card can go through the slot of the member and be inserted into the slot of the housing. The member may include side portions extending perpendicular to the mating surface and along the sides of the housing.

The member and the conductive elements may be configured coordinatively so as to provide both desired mechanical strength and desired signal integrity. In some embodiments, the conductive element may be configured to be shorter in the vertical direction, which may shorten signal paths and therefore improve signal integrity. In some embodiments, the mating end of each conductive elements may include first and second curved portions. The first curved portion may join the second curved portion and the intermediate portion. The second curved portion may extend into the slot to provide a mating contact region. Such a configuration may move the mating contact region closer to the mating surface of the housing so as to compensate a mating distance in the vertical direction added by a thickness of the member. Shorter conductive elements may enable the member to have a desired thickness in the vertical direction, which may improve mechanical strength. Such a configuration may also enable the overall height of the connector including the member to satisfy standard requirement.

FIGS. 1-13 are an example of designs as described herein integrated into a card edge connector 100. The card edge connector 100 may include an insulating housing 300. As illustrated in the drawings, a vertical direction Z-Z, a longitudinal direction X-X and a transverse direction Y-Y may be perpendicular to one another. The vertical direction Z-Z may refer to a height direction of the card edge connector 100. The longitudinal direction X-X may refer to a length direction of the card edge connector 100. The transverse direction Y-Y may refer to a width direction of the card edge connector 100.

Figure 8:
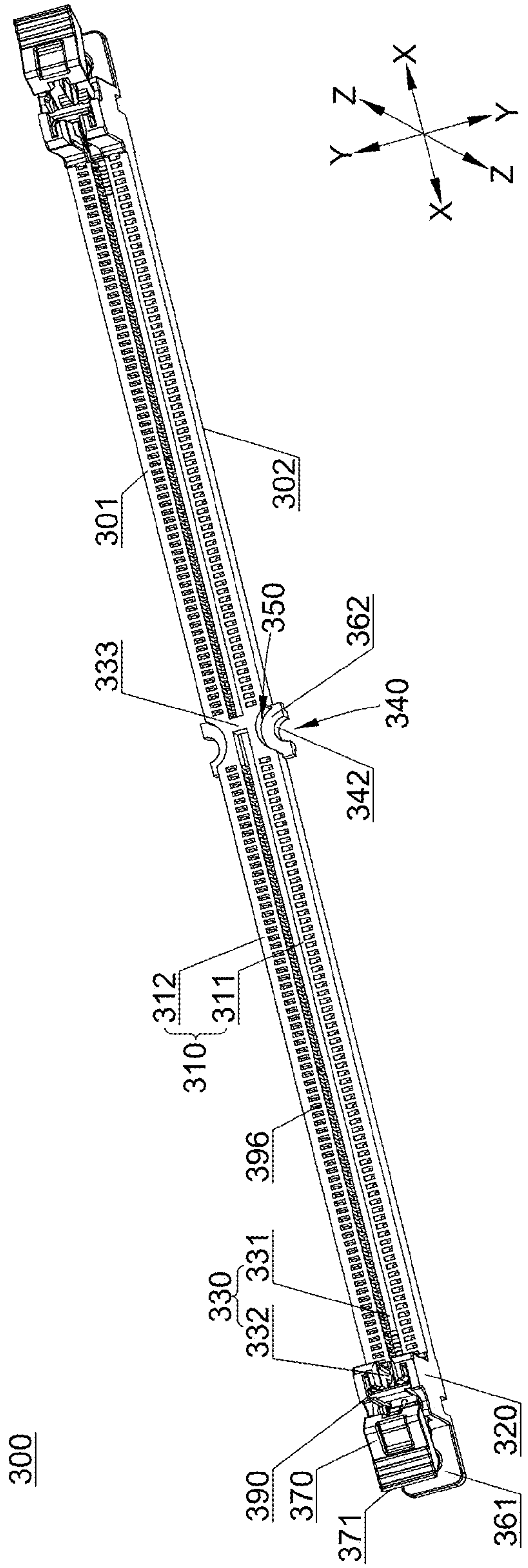
FIG. 8 is a top perspective view of an insulating housing of the card edge connector of the electronic system of FIG. 3.
Figure 9:
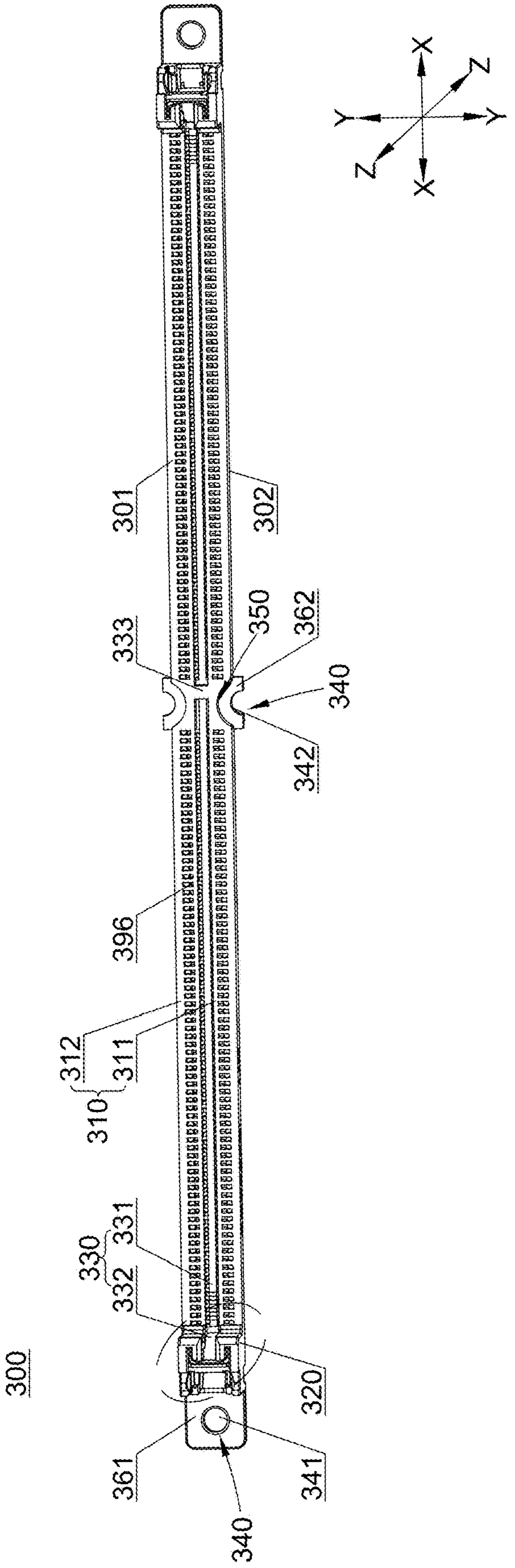
FIG. 9 is a plan view of the insulating housing of FIG. 8, with latches hidden.

As shown in FIGS. 8-9, the insulating housing 300 may have a mating surface 301 and a mounting surface 302. The mating surface 301 and the mounting surface 302 may be arranged oppositely in the vertical direction Z-Z. A card slot 330 may extend through the mating surface 301. In some embodiments, the card slot 330 may be recessed inwards in the vertical direction Z-Z from the mating surface 301. In some embodiments, the card slot 330 may extend in the longitudinal direction X-X. The card slot 330 may be used for receiving at least part of an electronic card 900 so as to hold the position of the electronic card 900 relative to the insulating housing 300. The electronic card may include one or more of a display card, a memory card, a sound card and the like. The insulating housing 300 may be molded of an insulating material, for example, plastic. The insulating housing 300 may be an integral member.

Figure 7B:
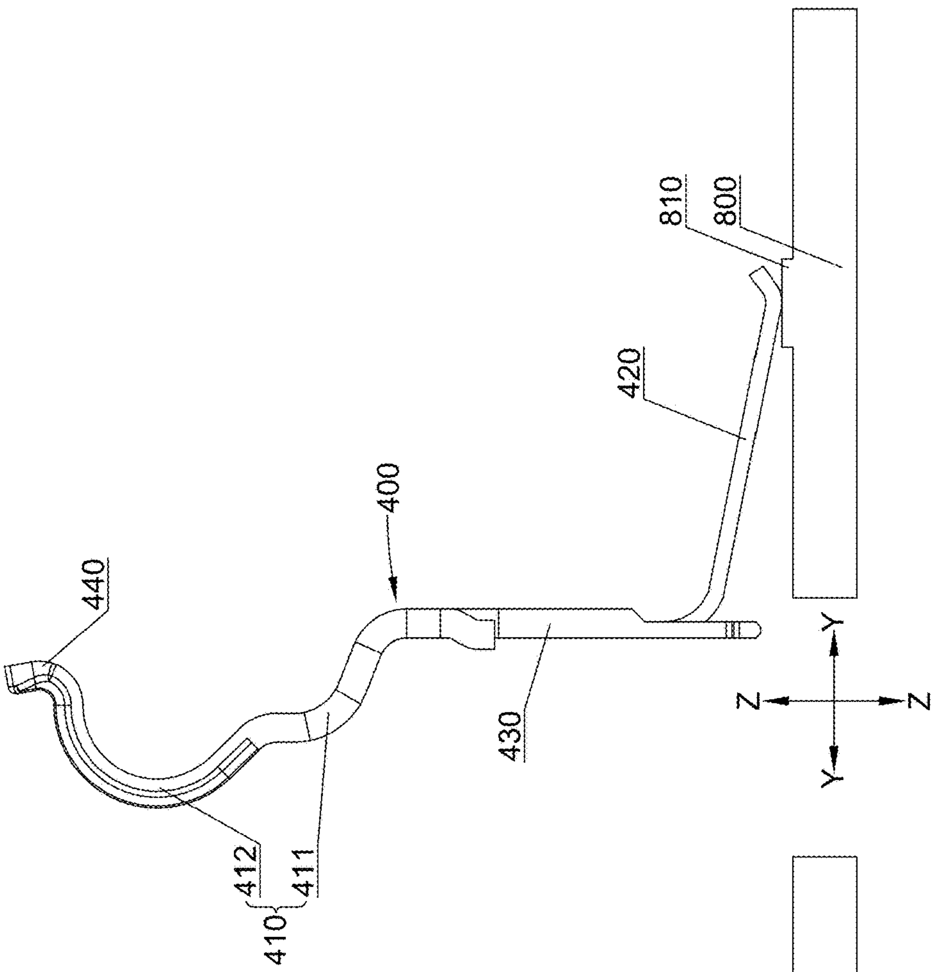
FIG. 7B is a cross-sectional side view of the electronic system of FIG. 7A, showing the conductive element of the card edge connector contacting the printed circuit board at a compressed state.
Figure 7A:
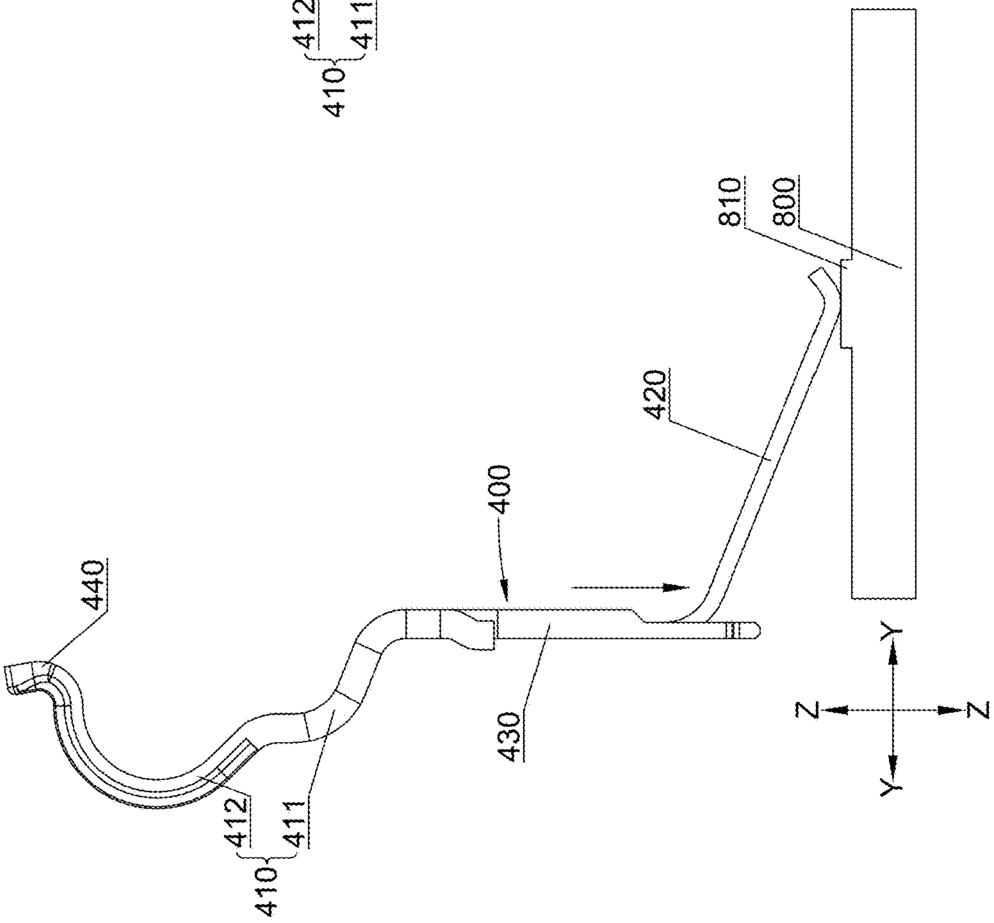
FIG. 7A is a cross-sectional side view of the electronic system of FIG. 3, showing a conductive element of the card edge connector contacting the printed circuit board at a rest state, with other elements hidden.
Figure 11B:
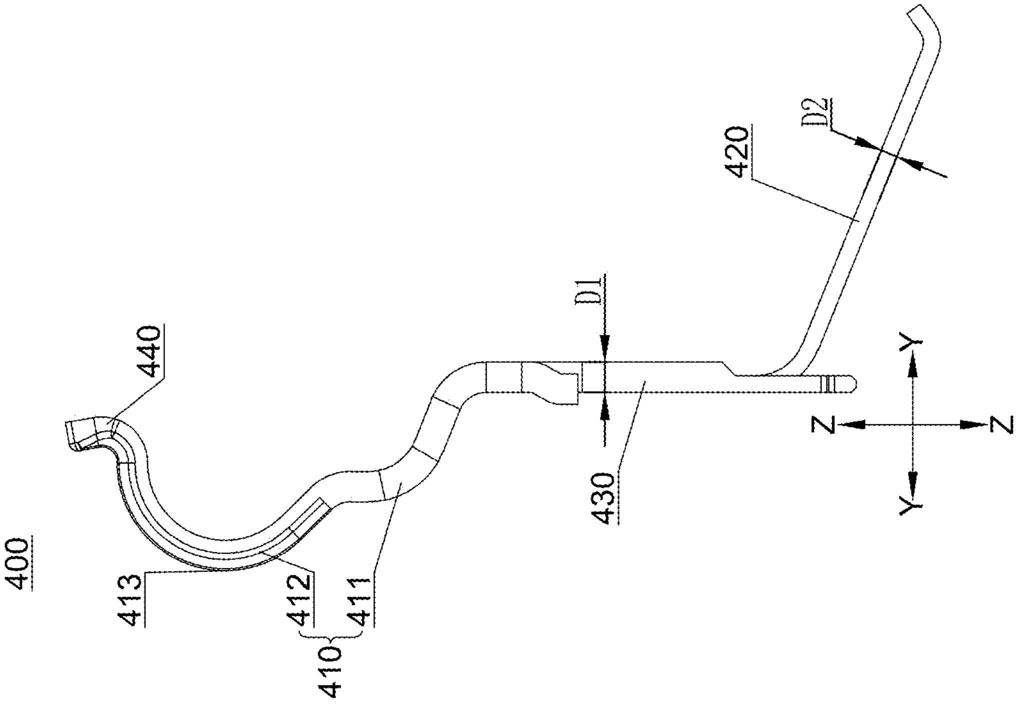
FIG. 11B is a side view of the conductive element of FIG. 11A.
Figure 11A:
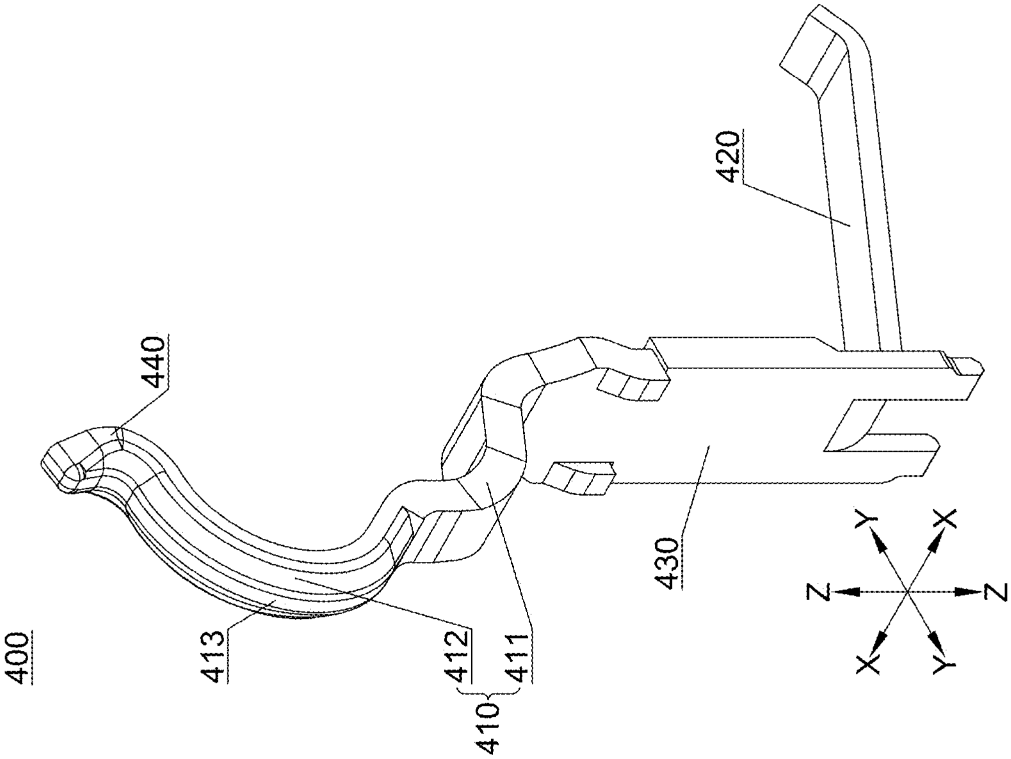
FIG. 11A is a perspective view of the conductive element of the card edge connector of the electronic system of FIG. 7A.

In some embodiments, the insulating housing 300 may be elongated. The insulating housing 300 may extend in the longitudinal direction X-X. The card slot 330 may be in elongated in the longitudinal direction X-X. The electronic card 900 may be inserted into the card slot 330. The mounting surface 302 may be connected to a circuit board 800 serving as a mainboard, and the electronic card 900 may be electrically connected to a circuit board 800 through the card edge connector 100. Therefore, circuits on the electronic card 900 and circuits on the circuit board 800 may be interconnected. In some embodiments, a plurality of conductive elements 400 may be held in the insulating housing 300. The plurality of conductive elements 400 may be arranged in the longitudinal direction X-X and spaced apart from each other in the insulating housing 300, so as to ensure electrical insulation between adjacent conductive elements 400. The plurality of conductive elements 400 may be distributed on both sides of the card slot 330. The electronic card 900 may have a plurality of golden fingers 910. As shown in FIGS. 11A-11B, each of the plurality of conductive elements 400 may have a mating end 410 and a mounting end 420 configured for pressure mount. The mating end 410 may extend into the card slot 330. When the edge of the electronic card 900 is inserted into the card slot 330, the mating ends 410 of the plurality of conductive elements 400 may be electrically connected to the golden fingers 910 on the electronic card 900. The mounting ends 420 of the plurality of conductive elements 400 may extend beyond the mounting surface 302. With reference to FIGS. 7A-7B, the mounting end 420 may be used for pressure mount to a contact pad 810 on the circuit board 800, thereby being electrically connected to the circuit on the circuit board 800. In some embodiments, a force, in a direction shown by an arrow, is applied to the card edge connector 100, which enables the mounting end 420 of the conductive element 400 to pressure mount to the contact pad 810 on the circuit board 800.

The mounting end 420 of each conductive element 400 of the card edge connector 100 can be in pressure mount to the contact pad 810 on the circuit board 800 in any suitable method. In some embodiments, the card edge connector 100 may be provided with any other suitable connecting structure and may be connected to the circuit board 800 through such connecting structure. In some embodiments, such connecting structure includes one or more of a snap joint and a threaded connecting member, which is convenient for the user to install the card edge connector 100 independently in field. After the card edge connector 100 is connected to the circuit board 800 in place, the mounting end 420 of each conductive element 400 may undergo certain elastic deformation. Therefore, shown as FIGS. 7A-7B, the mounting end 420 of each conductive element 400 may be in pressure mount to the contact pad 810 on the circuit board 800.

Figure 2:
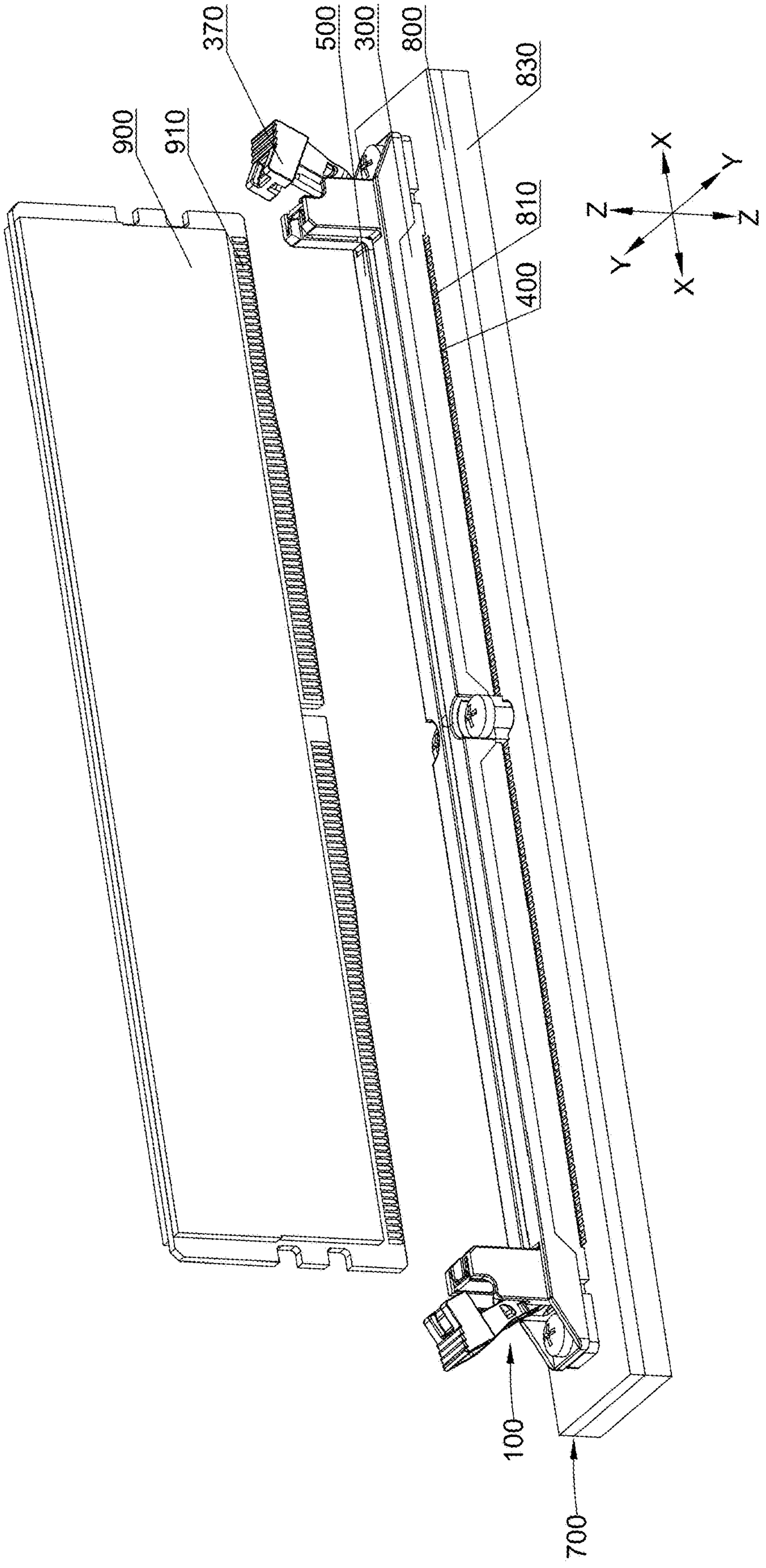
FIG. 2 is a perspective view of the electronic system of FIG. 1, showing the electronic card ejected out of the card edge connector.

Directional terms used herein are with respect to the placed state of the card edge connector 100 in FIGS. 1-2. That is to say, one side of the card edge connector 100, on which the mating surface 301 is located, faces up; and the other side, on which the opposite mounting surface 302 is located, faces down.

Conventionally, conductive elements of a card edge connector are soldered to a circuit board in the factory. According to aspects of the present disclosure, the conductive elements 400 of the card edge connector 100 may be separated from the circuit board 800 in lieu of being soldered onto the circuit board in the factory. In this way, the card edge connector 100 may provide simplified manufacturing procedures, shortened manufacturing period, lowered manufacturing cost, and improved market competitiveness. When a user needs to use the card edge connector 100, the mounting ends 420 may be pressure mount onto the contact pad 810 on the circuit board 800 by the user in field. Such a configuration may enable expanding capabilities of an electronic system by installing additional cards without pre-installing unpopulated card edge connectors. Conductive elements of a pre-installed, unpopulated connector may act as an unterminated stub, which can impact signal integrity. Also, a new card edge connector 100 may be changed onto the circuit boards 800 by the user if needed, for example, to replace a broken connector. Such a configuration may provide higher practicability.

Some embodiments of the present disclosure further provide an electronic system. The electronic system may include a circuit board and a card edge connector according to any one of the embodiments of the present disclosure. In an embodiment, as shown in FIGS. 1-6, the mounting surface 302 of the insulating housing 300 may be connected to the front side of the circuit board 800. The mounting ends 420 may pressure mount to the contact pads 810 on the circuit board 800. Therefore, an electronic system 700 does not require unpopulated connectors to be mounted in the factory, so that manufacturing procedures may be simplified, the manufacturing period is shortened, the manufacturing cost is lowered, the stub resonance is eliminated, and the market competitiveness of the electronic system 700 is improved.

As shown in FIGS. 8-9, the insulating housing 300 may include side portions 310. The side portions 310 may be provided with the conductive elements 400. The side portions 310 may include a first side portion 311 and a second side portion 312 on two sides of the card slot 330 respectively. The first side portion 311 and the second side portion 312 may be spaced apart from each other in the transverse direction Y-Y, and the card slot 330 is formed between the first side portion 311 and the second side portion 312. That is to say, each of the first side portion 311 and the second side portion 312 may be provided with the conductive elements 400. The conductive elements 400 on the two sides may align with each other or may be skewed by a certain interval in the longitudinal direction X-X. The conductive elements 400 on the two sides may be of a same structure and may be mirror images of each other. In other embodiments (not shown), the conductive elements 400 may be arranged on any one of the first side portion 311 and the second side portion 312, or the conductive elements 400 on the two side portions may be of different structures.

The insulating housing 300 may further include a tower 320. The tower 320 may be located at the end, in the longitudinal direction X-X, of the insulating housing 300. In some embodiments, the tower 320 may be connected to the end of the side portions 310. There may be a pair of towers 320. The pair of towers 320 may be connected to the two ends of a pair of the side portions 310 respectively. The towers 320 may extend in the vertical direction Z-Z and is higher than the side portions 310. The two ends of the card slot 330 may extend into the pair of the towers 320 respectively. That is to say, in the longitudinal direction X-X, a length of the card slot 330 may be larger than that of the side portion 310, so that the two ends of the card slot 330 may extend beyond the side portions 310 and extend into the towers 320. The mating surface 301 may be formed by the side portions 310 and the towers 320; and the mounting surface 302 may similarly be formed by the side portion 310 and the tower 320.

Figure 4:
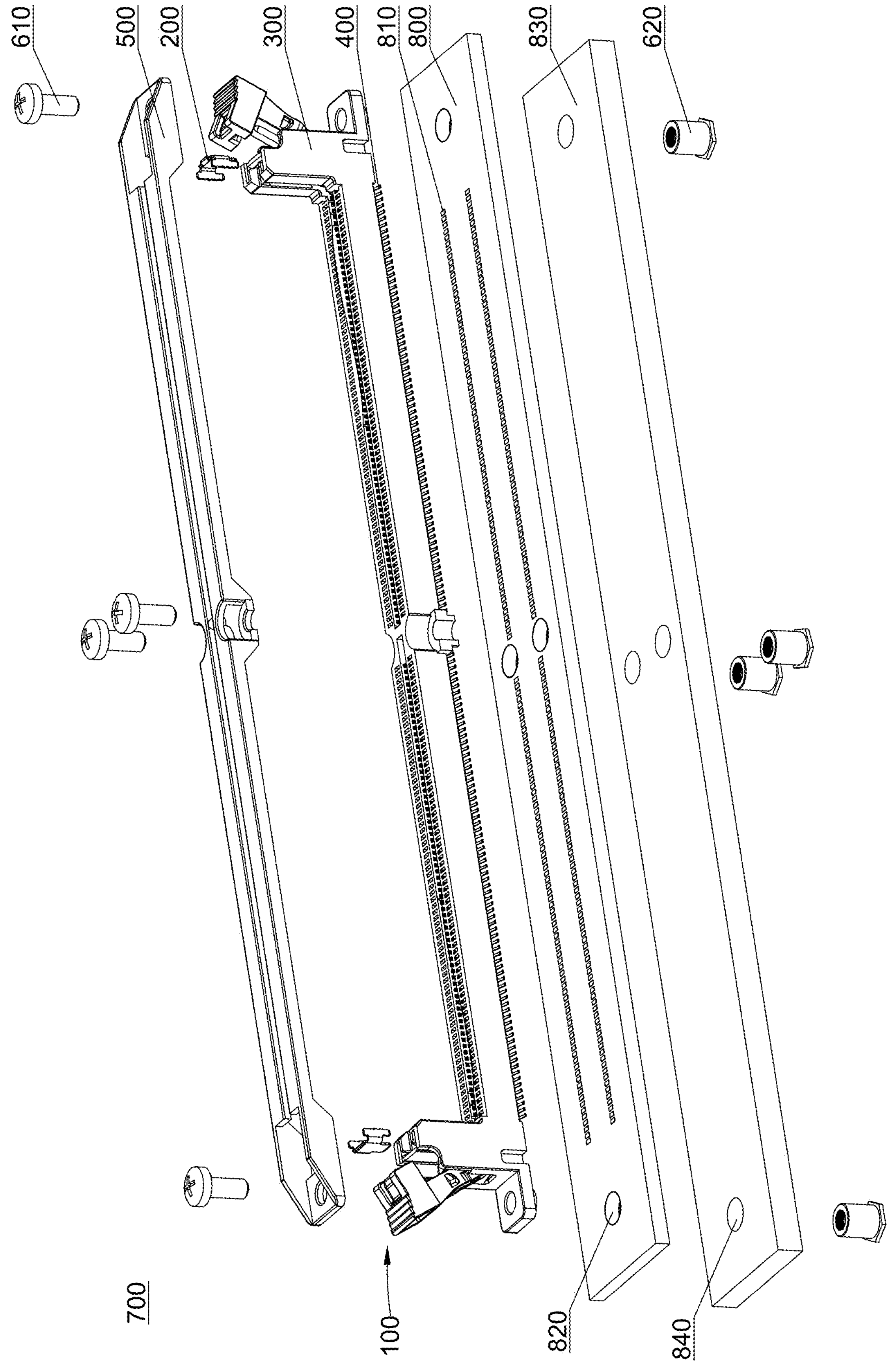
FIG. 4 is a partially exploded view of the electronic system of FIG. 3.
Figure 5:
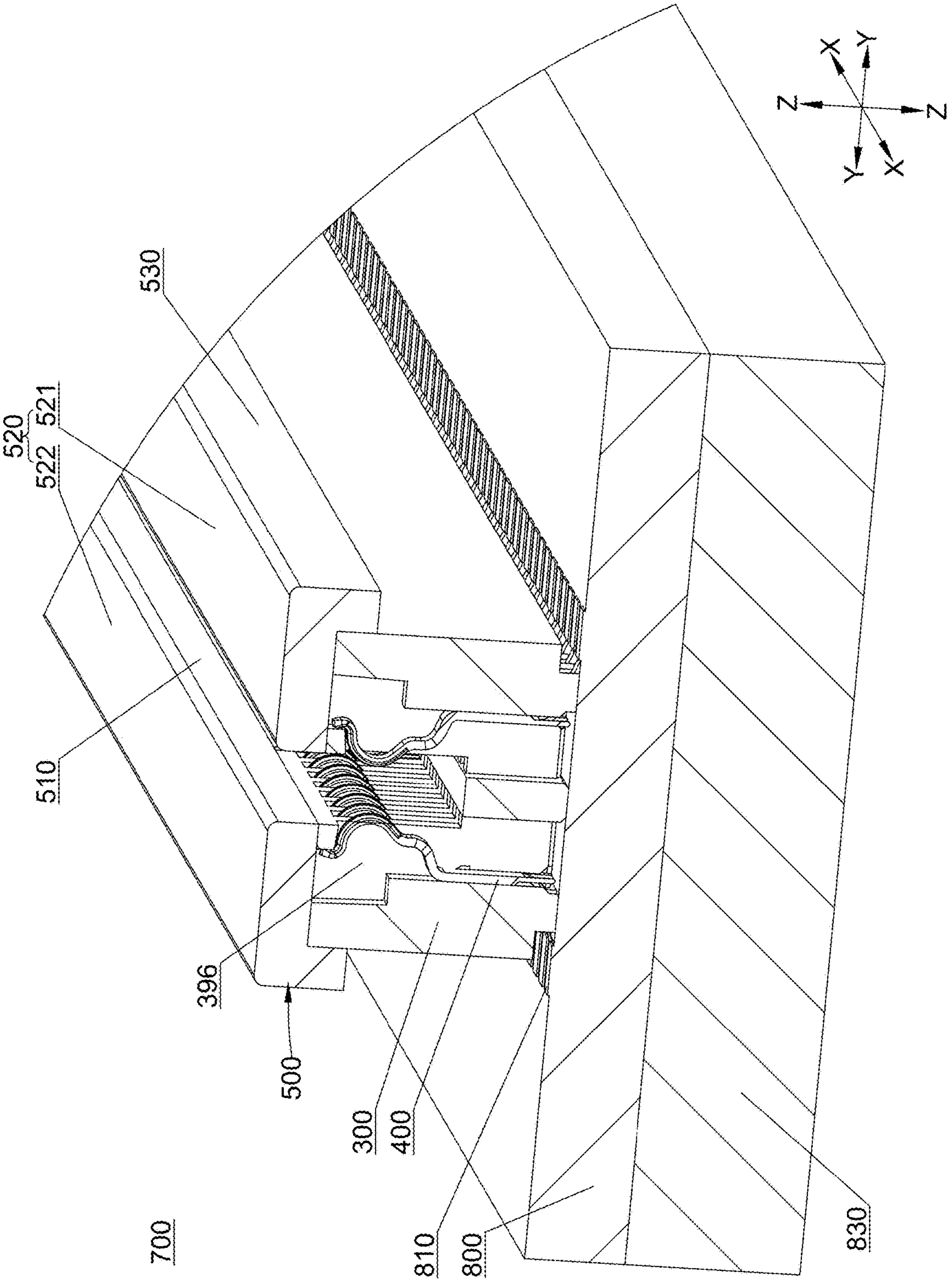
FIG. 5 is a cross-sectional perspective view of the electronic system of FIG. 3 along a line in a transverse direction.

As shown in FIGS. 4-5 and FIG. 11, a reinforcing member(s) 200 is arranged in one or both of the towers 320. In an exemplary embodiment, an insertion slot 390 may be formed in the tower 320. The reinforcing member 200 may be inserted into the insertion slot 390. A cross section of the reinforcing member 200 is U-shaped. The cross section refers to a section of the reinforcing member 200 cut with a plane perpendicular to the vertical direction Z-Z. An opening 201 of the U shape may face the card slot 330. The end of the card slot 330 may extend into the opening 201 of the U-shape. Two ends of the U shape are respectively located on two sides of the card slot 330 in the transverse direction Y-Y. That is, when viewed in the vertical direction Z-Z, the reinforcing member 200 surrounds the end of the card slot 330, such that the reinforcing member 200 surrounds the end of the card slot 330. The shape of the reinforcing member 200 may mate with that of the insertion slot 390. Optionally, only one tower 320 is provided with the reinforcing member 200; or each of the towers 320 is provided with the reinforcing member 200. In some embodiments, two reinforcing members 200 are arranged in the two towers 320 respectively, such that the two reinforcing members 200 surround two ends of the card slot 330, respectively.

In the illustrated example, the card slot 330 extends into the towers 320, which affects the strength of the towers 320. The towers 320 can be strengthened by providing the reinforcing members 200 in the towers 320, so as to improve their impact resistance. A longitudinal length of the entire card slot 330 may be greater than a transverse width. The towers 320 may deform or crack when subjected to an impact force in the transverse direction Y-Y. Therefore, further, the ends of the card slot 330 extend into the opening 201 of the U-shaped reinforcing member 200. In this way, when the electronic card 900 is inserted into the card slot 330, the reinforcing members 200 can maintain the shape of the towers 320 at the sides of the electronic card in the transverse direction Y-Y, so as to reduce the risk of deformation or cracking of the towers 320 when the electronic card 900 is impacted by an external force. In addition, since the vertical height of the towers 320 may be greater than the vertical height of the side portions 310, the increased strength of the towers 320 can effectively share the impact force on the side portions 310, and also strengthen the pair of side portions 310, thereby improving their impact resistances. In particular, the resistance to the impact force in the transverse direction Y-Y can be improved, thereby protecting the insulating housing 300 to a certain extent and preventing the insulating housing 300 from deforming or cracking.

The reinforcing member 200 may be inserted into the insertion slot 390 in any suitable direction, such as the longitudinal direction X-X (not shown) or the vertical direction Z-Z (as shown). Under situations that the reinforcing member 200 is installed into the tower 320 in different directions, the insertion slot 390 may have different shapes and structures. When the reinforcing member 200 is inserted into the insertion slot 390 in the longitudinal direction X-X, the insertion slot 390 may extend to the outer side surface of the tower 320 in the longitudinal direction X-X. In this way, the reinforcing member 200 may be inserted into the insertion slot 390 from the outer side surface. When the reinforcing member 200 is inserted into the insertion slot 390 in the vertical direction Z-Z, the insertion slot 390 may extend to the mating surface 301 or the mounting surface 302 of the tower 320 in the vertical direction Z-Z. In this way, the reinforcing member 200 may be inserted into the insertion slot 390 from the mating surface 301 or the mounting surface 302.

The reinforcing member 200 may be made of a high-strength material, such as plastic, ceramic, metal and so on. In some embodiments, the reinforcing member 200 is made of metal. The metal material has higher strength, and lower material cost and processing cost. In some embodiments, the reinforcing member 200 is an integral sheet metal piece. In this way, the reinforcing member 200 has higher strength, accompanied with simpler processing technology and lower cost. The insulating housing 300 and the reinforcing member 200 are made of different materials. The reinforcing member 200 is inserted into the insertion slot 390. The insulating housing 300 and the reinforcing member 200 can be separately manufactured and then assembled, thereby facilitating manufacturing and installation, and reducing the cost of the electrical connector 100.

Optionally, the reinforcing member 200 may be installed in the tower 320 in a non-plugging manner, and instead may be sealed in the insulating housing 300 while the insulating housing 300 is molded. However, this may result in higher cost of molds for producing the insulating housing 300.

Optionally, the insertion slot 390 extends to the mating surface 301 of the tower 320. The reinforcing member 200 is inserted into the insertion slot 390 from the mating surface 301. During the assembling of the conductive elements 400 and the reinforcing member 200 to the insulating housing

300, the insulating housing 300 may be conveyed along the longitudinal direction X-X to insertion modules of the assembling apparatus. The modules for inserting the conductive elements 400 and the reinforcing member 200 may be located below and above the insulating housing 300, respectively, and the conductive element 400 may be inserted from the mounting surface 302 and the reinforcing member 200 may be inserted into the insulating housing 300 from the mating surface 301. The electrical connector 100 in this configuration can make the layout of the assembling apparatus more reasonable, and the cooperation between the various modules is more efficient.

Figure 10:
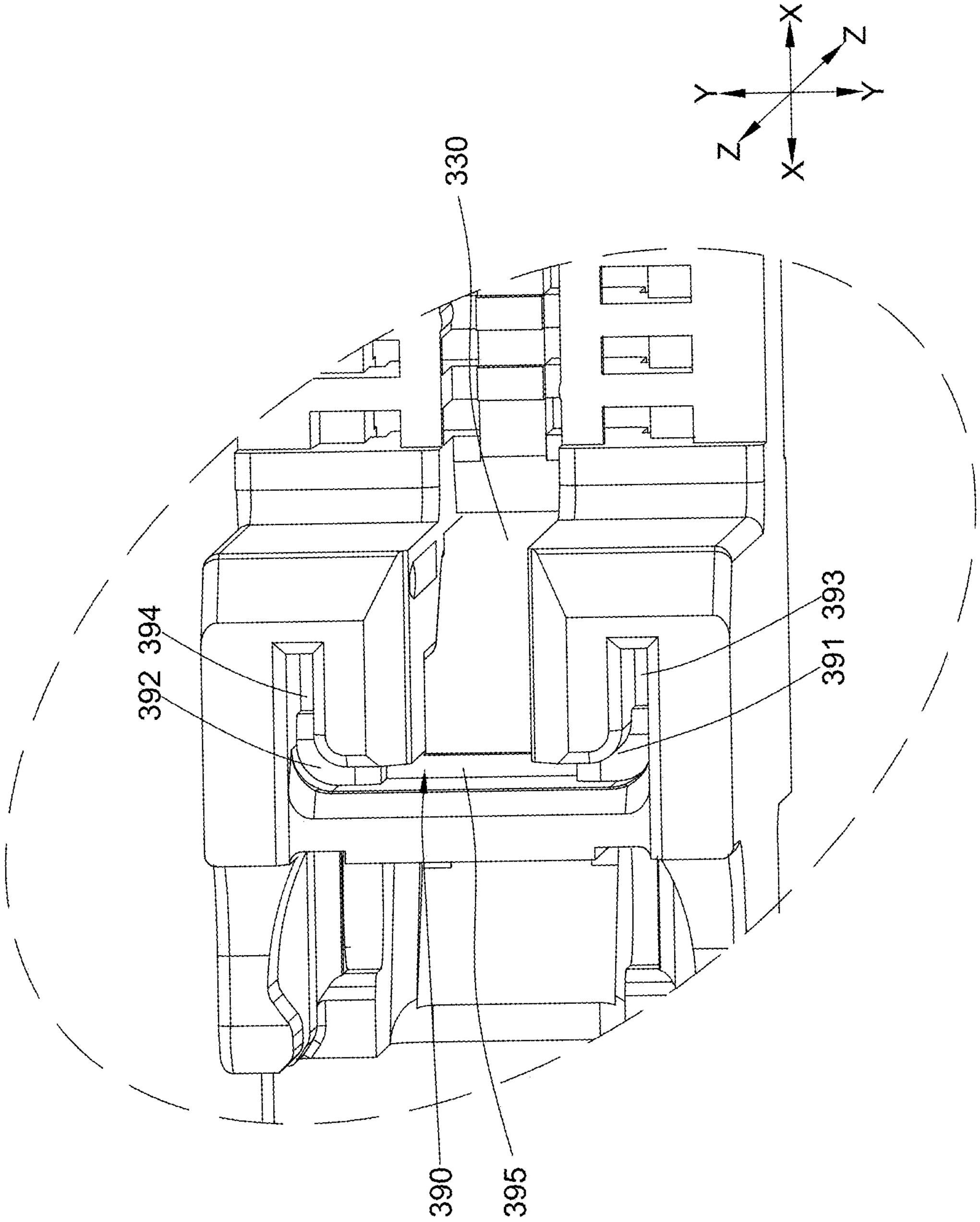
FIG. 10 is an enlarged view of a portion of the insulating housing of FIG. 9.
Figure 13:
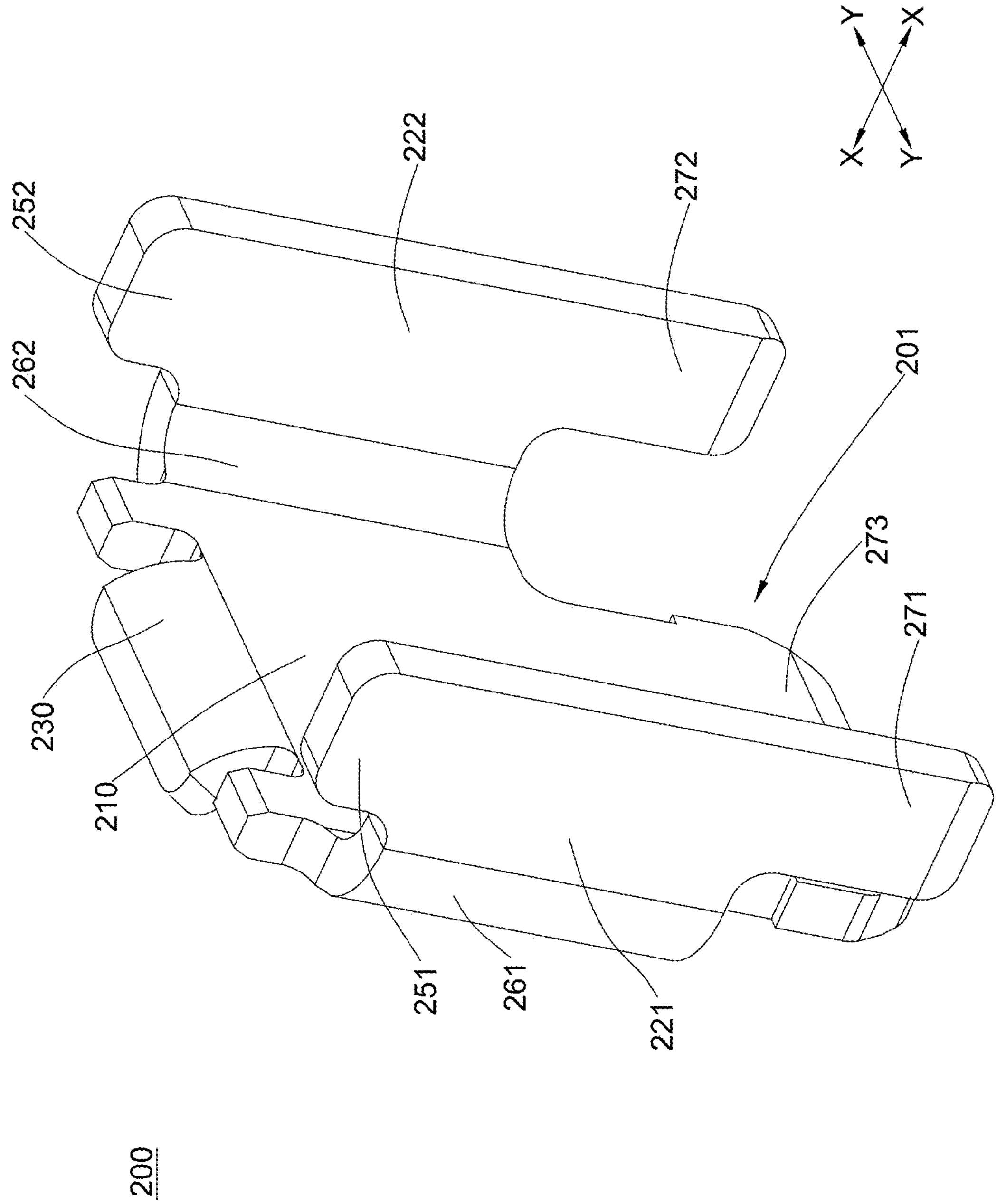
FIG. 13 is a perspective view of a reinforcing member of the card edge connector of the electronic system of FIG. 3.

In some embodiments, as shown in FIG. 10, a first step 391 and a second step 392 may be arranged at the bottom of the insertion slot 390. The first step 391 and the second step 392 may be spaced apart in the transverse direction Y-Y. A first recess 393 and a second recess 394 are respectively formed on two sides of the first step 391 and the second step 392. A third recess 395 is formed between the first step 391 and the second step 392. The first recess 393 and the second recess 394 may be respectively located on two sides of the card slot 330 in the transverse direction Y-Y. The lower portion of the reinforcing member 200 may be adaptive with the bottom of the insertion slot 390. Correspondingly, as shown in FIG. 13, the lower portion of the reinforcing member 200 may be provided with a first protrusion 271, a second protrusion 272 and a third protrusion 273. The first protrusion 271, the second protrusion 272, and the third protrusion 273 are inserted into the first recess 393, the second recess 394, and the third recess 395, respectively. The first step 391 and the second step 392 may be same or different in shape and size. The first recess 393 and the second recess 394 may be same or different. With the first step 391 and the second step 392, the thickness of the bottoms of the tower 320 can be increased, the structural strength of the tower 320 can be improved, and the reinforcing member 200 can be better supported to prevented it from impacting the circuit board. In addition, with the first recess 393, the second recess 394, and the third recess 395, the size of the reinforcing member 200 in the vertical direction Z-Z can be extended as much as possible, and the insulating housing 300 can be protected to a larger extent from deforming or cracking.

Optionally, the depth of the third recess 395 may be greater than the depth of the first recess 393 and the depth of the second recess 394. In this way, an insertion depth of a main portion of the reinforcing member 200 can be increased, which is beneficial to increase the vertical height of the opening 201, ensure the interference force of the reinforcing member 200, and protect the towers 320 to a larger extent from deforming or cracking.

Optionally, the depth of the third recess 395 may be less than or equal to the depth of the first recess 393 and the depth of the second recess 394.

In some embodiments, as shown in FIG. 13, the reinforcing member 200 may include a transverse part 210, a first longitudinal part 221 and a second longitudinal part 222. The transverse part 210 extends in the transverse direction Y-Y. The first longitudinal part 221 and the second longitudinal part 222 extend in the longitudinal direction X-X from two ends of the transverse part 210. The first longitudinal part 221 and the second longitudinal part 222 may be same or different. The first longitudinal part 221 and the second longitudinal part 222 are spaced apart to form the U-shaped opening 201. The aforementioned first protrusion 271, the second protrusion 272, and the third protrusion 273 may be arranged on the transverse part 210, the first longitudinal part 221 and the second longitudinal part 222, respectively. The reinforcing member 200 may further include an elastic part 230. The elastic part 230 is bent from the top of the transverse part 210 toward a direction away from the card slot 330. A curvature radius of the elastic part 230 may be arbitrary. The elastic part 230 may abut against the side of the insertion slot 390. In an exemplary embodiment, the first longitudinal part 221, the second longitudinal part 222, the elastic part 230 and the transverse part 210 may be spliced together by means of, for example, welding, bonding, etc., or may be integrally formed. The elastic part 230 can play a guiding role. When the electronic card 900 is inserted into the card slot 330 in the vertical direction Z-Z, the elastic part 230 can protect the electronic card 900 from being scratched. The electronic card 900 can be effectively inserted into the card slot 330.

Optionally, the reinforcing member 200 may further include a first extension part 251 and a second extension part 252. The first extension part 251 and the second extension part 252 extend upward from the first longitudinal part 221 and the second longitudinal part 222, respectively. The first extension part 251 and the second extension part 252 may be same or different. In an exemplary embodiment, the first extension part 251 and the first longitudinal part 221, as well as the second extension part 252 and the second longitudinal part 222 may be spliced together by means of, for example, welding, bonding, etc., or may be integrally formed. The first extension part 251 and the second extension part 252 can increase a vertical size of the reinforcing member 200 as much as possible so as to enhance the resistance of the reinforcing member 200 to an impact force, so that the insulating housing 300 can be better protected from deforming or cracking.

Optionally, the transverse part 210 and the first longitudinal part 221 may be connected by a first arc transition part 261. The transverse part 210 and the second longitudinal part 222 may be connected by a second arc transition part 262. A curvature radius of the first arc transition part 261 and a curvature radius of the second arc transition part 262 may be arbitrary. In this way, the reinforcing member 200 is easily processed and formed from a plate, and the production cost thereof is relatively lower.

In the illustrated embodiment, as shown in FIGS. 8-9, the card slot 330 may extend from the side portions 310 into the towers 320. The card slot 330 may include a card insertion slot 331 and card locked grooves 332. The card insertion slot 331 is located between the pair of side portions 310, and extends in the longitudinal direction X-X. The card insertion slot 331 may be internally provided with a separating rib 333, to separate the card insertion slot 331 into multiple independent sections. The separating rib 333 not only improves the mechanical strength of the side portions 310, but also has a fool-proofing function by arranging the separating rib 333 in non-center positions of the card insertion slot 331. Each tower 320 may be internally provided with a card locked groove 332. A pair of card locked grooves 332 are respectively positioned on side surfaces of the pair of towers 320 facing each other, and the pair of card locked grooves 332 extend along the vertical direction Z-Z. Lower ends of the pair of card locked grooves 332 are respectively connected to both ends of the card insertion slot 331. In this way, the U-shaped card slot 330 is formed.

In some embodiments, as shown in FIG. 8, the electrical connector 100 may include a pair of latches 370. The pair of latches 370 may be connected to the pair of towers 320 respectively. The latches 370 may be detachably or pivotally connected to the towers 320. In some embodiments, the latches 370 may be pivoted between a locked position and an unlocked position. In FIG. 1, the latches 370 are in a locked position, and the latches 370 are capable of locking the electronic card 900 to the electrical connector 100. In FIG. 2, the latches 370 are in an unlocked position, the electronic card 900 may be inserted into the card slot 330, or the electronic card 900 may be removed from the insulating housing 300. The reinforcing member 200 may be wrapped by a corresponding latch 370 and a corresponding tower 320 when the latches 370 is in the locked position. Therefore, it is possible to ensure that the reinforcing member 200 cannot be contaminated by external dust and other dirt, and cannot be oxidized, etc., thereby ensuring the structural strength of the reinforcing member 200 and better protecting the insulating housing 300. The latches 370 may be molded from insulating materials such as plastic by a molding process. The latches 370 are integral members. The latches 370 and the insulating housing 300 may be made of the same or different materials.

In some embodiments, an insulating housing mounting hole(s) 340 may be formed in the insulating housing 300, as shown in FIGS. 8-9. The number of the insulating housing mounting hole(s) 340 may be any suitable number, comprising but not limited to four shown in the drawing, for example, may be one, two or other. Structures of the insulating housing mounting holes 340 may be same or different. A circuit board mounting hole 820 may be formed in the circuit board 800, as shown in FIG. 4. The circuit board mounting hole 820 may be aligned with the insulating housing mounting hole 340. For example, a threaded connecting member such as a bolt 610 may be in threaded connection with the insulating housing mounting hole 340 and the circuit board mounting hole 820 to connect the both together; and therefore, the mounting ends 420 may pressure mount to the contact pads 810 on the circuit board 800. Optionally, a nut 620 may further be provided, for example, the threaded connecting member such as the bolt 610 may penetrate through the insulating housing mounting hole 340 and the circuit board mounting hole 820 to be connected to the nut 620. Therefore, the bolt 610 and the nut 620 may be used for clamping the insulating housing 300 and the circuit board 800 to achieve pressure mount of the mounting ends 420 to the contact pads 810 on the circuit board 800.

The insulating housing mounting hole 340 may include a first insulating housing mounting hole 341 and/or a second insulating housing mounting hole 342. The first insulating housing mounting hole 341 may be formed at the outer side of the tower 320 in the longitudinal direction X-X. Optionally, a first insulating housing mounting hole 341 may be formed in the outer side of one tower 320 only; or two first insulating housing mounting holes 341 may be formed in the outer sides of the two towers 320 respectively. In some embodiments, the first insulating housing mounting holes 341 may be formed in the outer sides of the two towers 320 and may be located at two ends, in the longitudinal direction X-X, of the insulating housing 300. The second insulating housing mounting hole 342 may be formed in the middle of the insulating housing 300 in the longitudinal direction X-X. The middle includes, but not limited to, the right center. For example, it may offset by a certain distance in the longitudinal direction X-X and/or the transverse direction Y-Y. In some embodiments, the second insulating housing mounting hole 342 may be formed in a separating rib 333. The position, at which the separating rib 333 is located, may not be provided with any conductive element; and the portion of the insulating housing 300 having the separating rib 333 may be relatively higher in strength. It may reduce the size of the insulating housing 300 and may further have no effect on the mechanical strength of the insulating housing 300 basically by providing the second insulating housing mounting hole 342 in the separating rib 333. In some embodiments, both the first insulating housing mounting hole 341 and the second insulating housing mounting hole 342 may be provided. In this way, the pressure, facing the circuit board 800, may be applied to the insulating housing 300 at the end and the middle of the insulating housing 300 respectively, so that the plurality of mounting ends 420 distributed in the longitudinal direction X-X may pressure mount to the contact pads 810 on the circuit board 800 uniformly. The warpage of the insulating housing 300 and/or the circuit board 800 due to the pressure may be alleviated. The uniform pressure mount between the plurality of mounting ends 420 and the contact pads 810 on the circuit board 800 may ensure consistent contact areas between the plurality of mounting ends 420 and the contact pads 810, and then contact impedance may be uniform among the plurality of mounting ends 420. Therefore, balanced impedance can be maintained between different signal conductors, and the stability of signal transmission is ensured.

Figure 14:
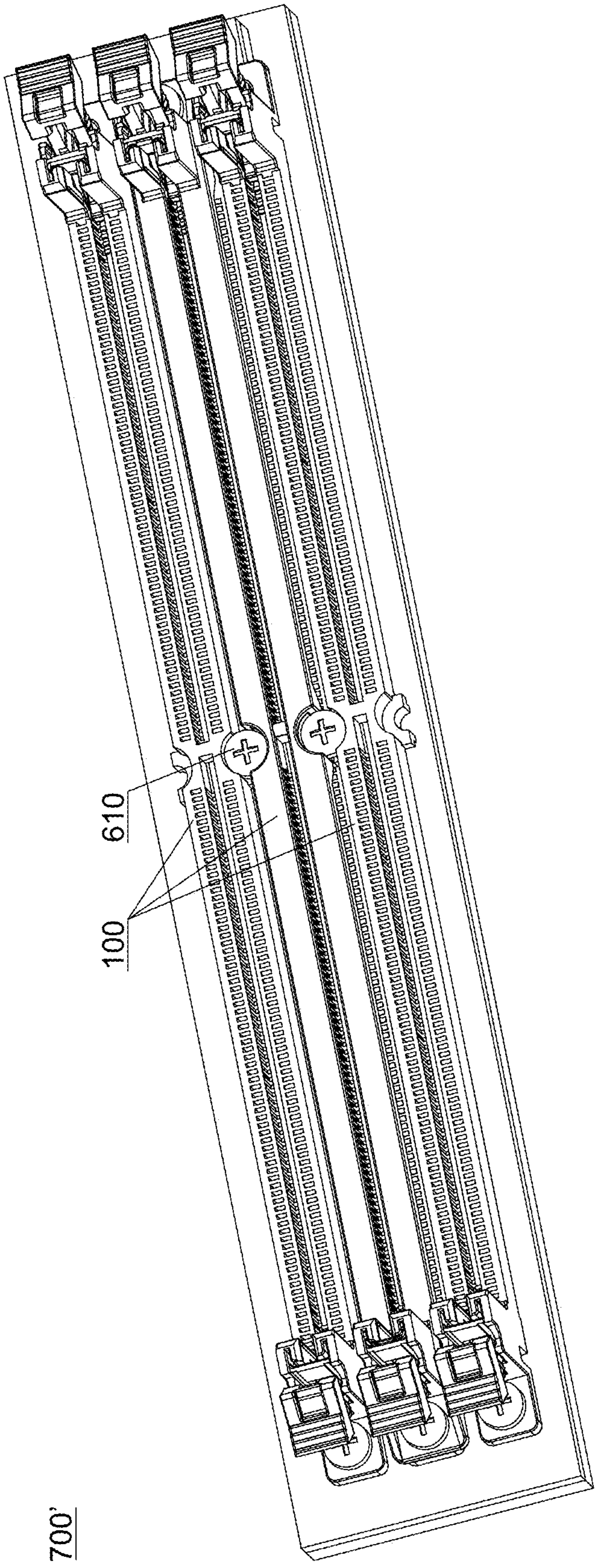
FIG. 14 is a perspective view of an electronic system, showing a plurality of card edge connectors mounted on a printed circuit board, according some embodiments.

In some embodiments, as shown FIGS. 8-9, the tower 320 may be provided with a first lug 361. The first lug 361 may extend along the mounting surface 302. The first insulating housing mounting hole 341 may be formed in the first lug 361. Optionally, the first lug 361 may extend longitudinally outward along the mounting surface 302 and may further extend transversely outward. Optionally, part of the first lug 361 extends longitudinally outward, and the other part extends transversely outward. In some embodiments, the first lug 361 extends longitudinally outward along the mounting surface 302. When a plurality of the card edge connectors 100 are arranged in the transverse direction Y-Y side-by-side, the first lug 361 cannot interfere with a first lug 361 on the adjacent card edge connector 100, as shown in FIG. 14. The first lug 361 extending along the mounting surface 302 may be attached to the circuit board 800 when the insulating housing 300 is mounted on the circuit board 800, which reduces the risk of a gap from forming between the first lug 361 and the circuit board 800. If there is the gap between the first lug 361 and the circuit board 800, the first lug 361 may deform and even be damaged after the connecting member penetrates through the first insulating housing mounting hole 341 formed in the first lug 361. In addition, the first lug 361 arranged along the mounting surface 302 can be far away from the latch 370, and it has less interference on pivoting of the latch 370.

In some embodiments, as shown in FIG. 8, the first lug 361 extends in the longitudinal direction X-X without exceeding the latch 370 which is pivoted to an unlocked position. When the latch 370 pivots to the unlocked position, longitudinal outermost edge 371 of the latch 370 may be located at longitudinal outer side of the first lug 361 or overlap an edge of the first lug 361. Therefore, the first lug 361 cannot cause increase in area on the circuit board 800 occupied by the card edge connector 100. Such a configuration may enable the connector to satisfy dimension requirements of industry standard. A projection of the latch 370 pivoting to the unlocked position on the mounting surface 302 may cover a projection of the first lug 361 on the mounting surface 302, so that it can have less effect on the compactness of the electronic system employing the card edge connector. The mounting surface 302 may be parallel to the circuit board 800. When viewing in the vertical direction perpendicular to the circuit board 800, the first lug 361 may not extend beyond the latch 370 pivoting to the unlocked position in various directions, and therefore, the first lug 361 may not affect the occupied space of the card edge connector 100 on the circuit board 800.

In some embodiments, as shown in FIGS. 8-9, the second insulating housing mounting hole 342 may be formed on the side, extending in the longitudinal direction X-X, of the insulating housing 300. With such arrangement, the insulating housing 300 may have simple and concise structure and lower manufacturing cost. Also, mounting and dismounting of the electronic card 900 may not be affected.

In some embodiments, the second insulating housing mounting hole 342 may be a half hole. In a cross section of the half hole, the half hole may communicate with the external in the transverse direction Y-Y. The cross section of the half hole refers to a cross section perpendicular to the vertical direction Z-Z. In some embodiments, the cross section of the half hole may be in a shape of semicircle. The straight edge of the semicircle may face the external. The half hole may communicate with the external through one side, on which the straight edge is located. In other embodiments (not shown), the half hole may also be in any suitable shape. The shape of the half hole may depend on the shape and the structure of the connecting member used. As the electronic system becomes more and more compact and the intensive degree becomes higher and higher, the size of the insulating housing 300 in the transverse direction Y-Y may be very limited. Such a configuration may enable the half hole to have a relatively larger diameter in a limited space, such that a relatively larger connecting member may be used to connect the card edge connector having the insulating housing 300 to the circuit board. It may lower the difficulty of the connecting operation. Moreover, it may enable the second insulating housing mounting holes 342 formed in the two adjacent insulating housings 300 to form a through hole.

Figure 15:
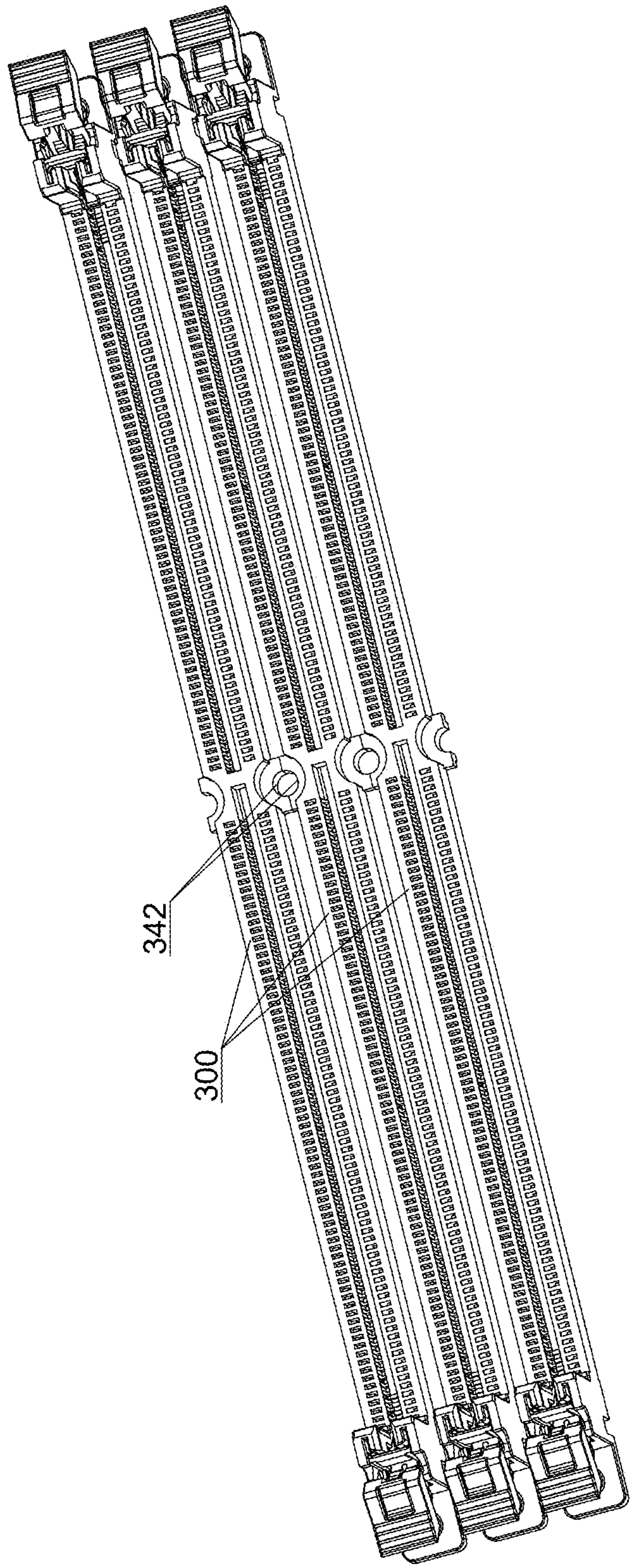
FIG. 15 is a perspective view of insulating housings of the plurality of card edge connectors of the electronic system of FIG. 14.

As the electronic system becomes more and more compact, and the intensive degree becomes higher and higher, a plurality of card edge connectors may be connected to one circuit board in the transverse direction Y-Y one by one, that is, two adjacent card edge connectors may be disposed very close to each other, with reference to FIGS. 14-15. On this basis, the second insulating housing mounting hole 342 may be configured to form a through hole with a second insulating housing mounting hole 342 formed in an adjacent card edge connector 100 to share a same connecting member. In another embodiment, the electronic system 700' may include a plurality of card edge connectors 100. The number of the card edge connectors 100 includes, but not limited to, three as shown in the drawing, for example, may be two, four or more. The card edge connectors 100 may be same or different. The plurality of card edge connectors 100 may be adjacent in the transverse direction Y-Y to each other. With such arrangement, the adjacent card edge connectors 100 may be in connection with the circuit board 800 by sharing common connecting members. Therefore, the number of the connecting members may be reduced. Moreover, when a large number of card edge connectors need to be connected to the circuit board 800, the number of steps of connecting operation may be reduced, and the cost of the electronic system employing the card edge connector 100 is further lowered.

Figure 3:
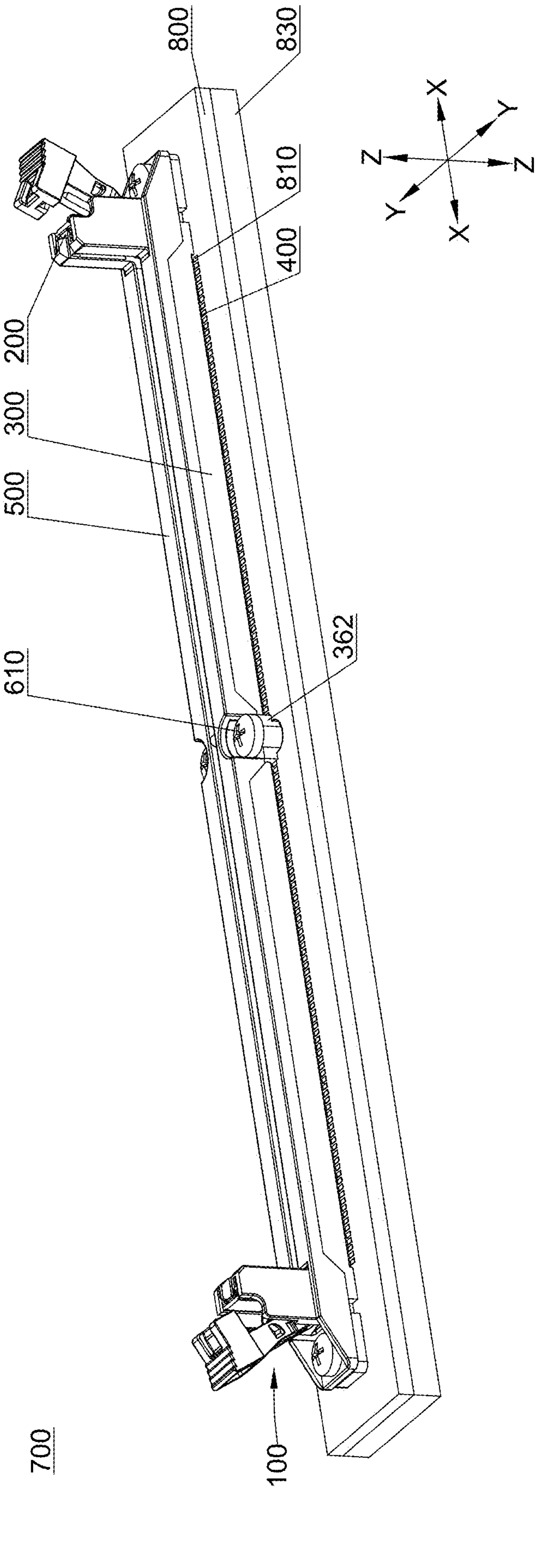
FIG. 3 is a perspective view of the electronic system of FIG. 2, with the electronic card hidden.

In some embodiments, the side, extending in the longitudinal direction X-X, of the insulating housing 300 may be provided with an insulating housing recess 350 and a second lug 362, referring back to FIGS. 8-9. The second lug 362 may extend in the transverse direction Y-Y outward from the interior of the insulating housing recess 350. The second insulating housing mounting hole 342 may be formed in the second lug 362. When there is a gap between the insulating housings 300 of the two adjacent card edge connectors 100, the second lug 362 may extend out of the insulating housing recess 350, so as to improve the mechanical strength of the second lug 362. As will be described hereinafter, the card edge connector 100 may include a member 500, and the member 500 can cover the side surface, extending in the longitudinal direction X-X, of the insulating housing 300. In this case, a gap would be formed between the insulating housings 300 of the two adjacent card edge connectors 100, and the second lug 362 may extend outward in the longitudinal direction X-X to the position near the outermost side of the member 500. For example, the outermost side of the second lug 362 is substantially flush with the outermost side of the member 500, as shown in FIG. 3. Therefore, it may not occupy an additional area of the circuit board, and the second lug 362 may have sufficient mechanical strength. The second lug 362 may be adjacent to the mounting surface 302. Therefore, the second lug 362 may be attached to the circuit board 800 when the insulating housing 300 is mounted on the circuit board 800, which reduces the risk of a gap from forming between the second lug 362 and the circuit board 800. When there is the gap between the second lug 362 and the circuit board 800, after the connecting member penetrate through the second insulating housing mounting hole 342 formed in the second lug 362, the second lug 362 may deform and then be damaged.

Figure 16:
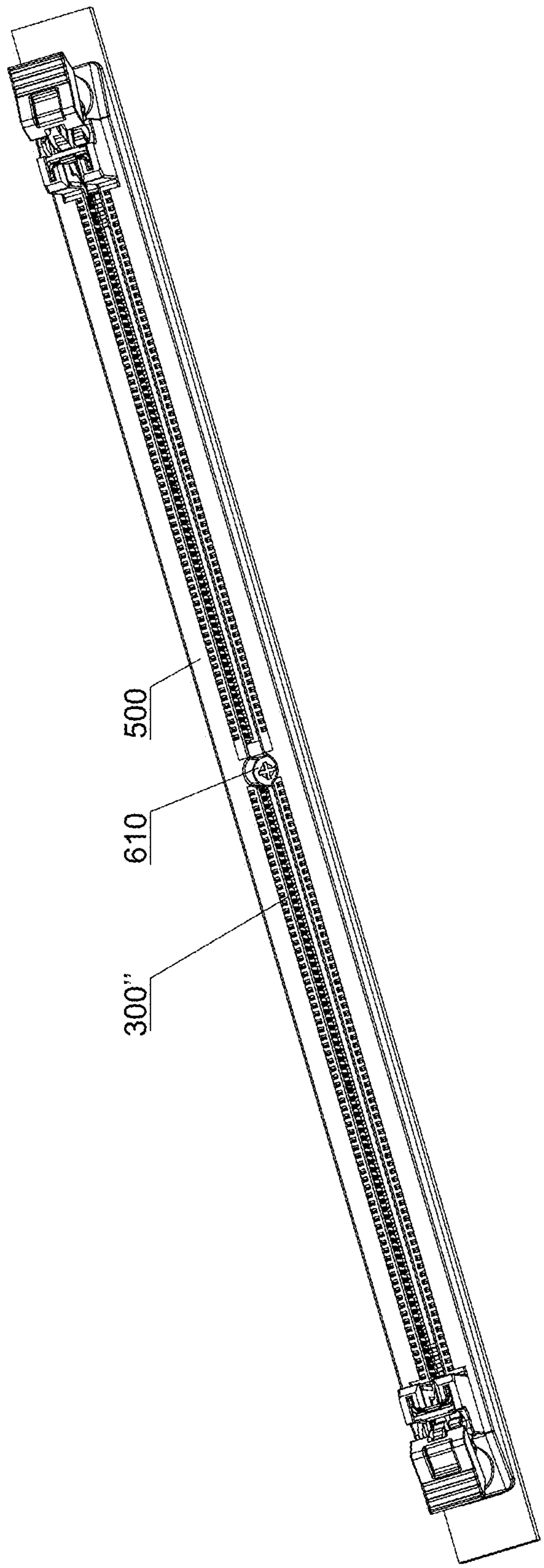
FIG. 16 is a perspective view of an electronic system, showing a card edge connector mounted on a printed circuit board, according to some embodiments.
Figure 17:
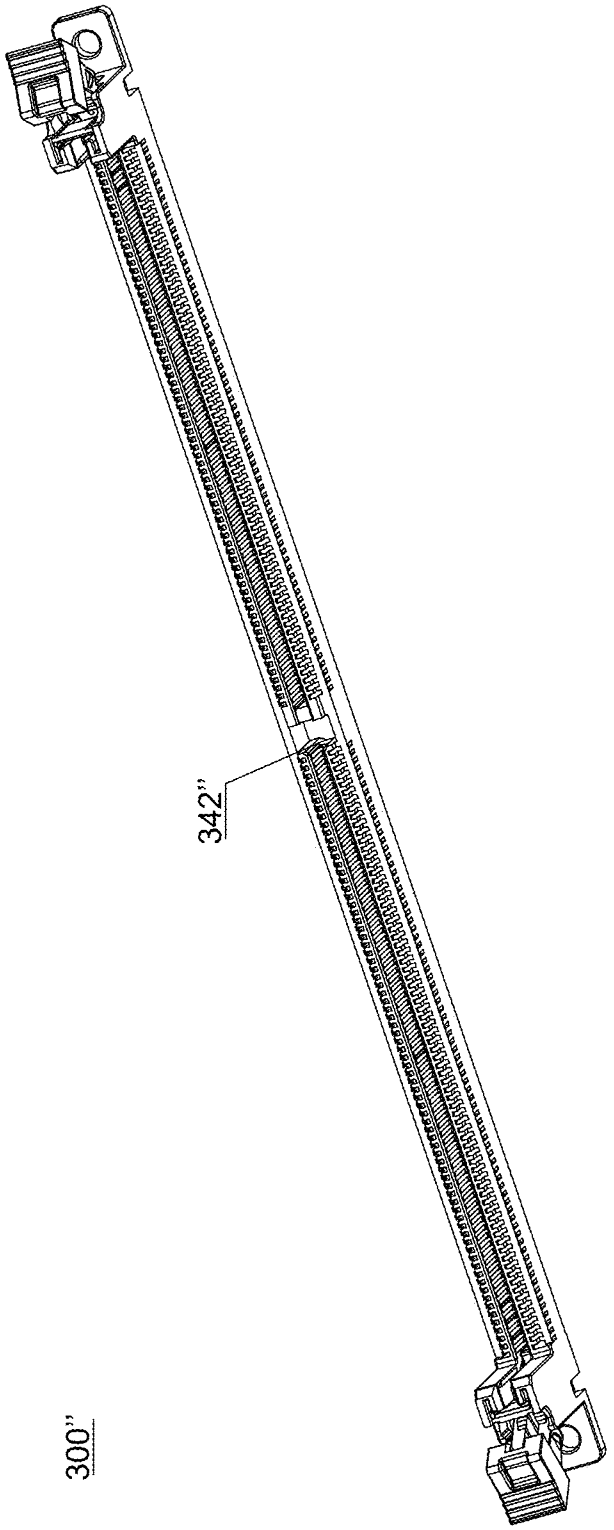
FIG. 17 is a perspective view of an insulating housing of the card edge connector of the electronic system of FIG. 16.

In some embodiments, as shown FIGS. 16-17, the second insulating housing mounting hole 342" may be formed in the insulating housing 300". Therefore, the second insulating housing mounting hole 342" cannot cause an increase in size of the insulating housing 300", and it has relatively less effect on mounting of the insulating housing 300". When the second insulating housing mounting hole 342" is formed in the insulating housing 300", and only one second insulating housing mounting hole 342" may be arranged. Correspondingly, the card edge connector may be connected to the circuit board through one connecting member, such as the bolt 610, in the middle of the insulating housing 300".

In some embodiments, as shown in FIGS. 1-6 and FIG. 12, the card edge connector 100 may further include a member 500. The member 500 may be mounted on one side, on which the mating surface 301 is located. The member 500 may be mounted on the insulating housing 300 in any suitable manner. The member 500 and the circuit board 800 may clamp the insulating housing 300 therebetween. A slot 510, through which the card slot 330 is exposed, may be formed in the member 500. The member 500 may be used for applying pressure to the insulating housing 300. Therefore, the mounting ends 420 may pressure mount to the contact pads 810 on the circuit board 800.

In embodiments where the card slot 330 is internally provided with the separating rib 333, the slot 510 may be internally provided with a shell reinforcing separating rib 570. The shell reinforcing separating rib 570 may be aligned with the separating rib 333. The shell reinforcing separating rib 570 may divide the slot 510 into a plurality of independent sections. The shell reinforcing separating rib 570 may improve the mechanical strength of the member 500 and may further have a fool-proof function by arranging the shell reinforcing separating rib 570 at the decentered position of the slot 510.

The member 500 may be made of a material with relatively larger strength, for example, plastics, ceramics, a metal and the like. In some embodiments, the member 500 is an integral sheet metal part. Therefore, the member 500 is relatively higher in strength, simpler in processing process and relatively lower in cost.

By arranging the member 500, the warpage of the insulating housing 300 due to the pressures between the mounting ends 420 and the circuit board 800 may be reduced. In some embodiments, if the structure strength of the insulating housing 300 is high enough, there may be no need for arranging the member 500.

In the electronic system 700, the member 500 may be fixed on the circuit board 800. The insulating housing 300 may be clamped between the member 500 and the circuit board 800. In some embodiments, the bolt 610 may penetrate through the member 500. Therefore, the connecting members, such as the bolt 610 and the nut 620, may be used for clamping the member 500, the insulating housing 300 and the circuit board 800 to achieve pressure mount of the mounting ends 420 to the contact pads 810 on the circuit board 800. It should be noted that in the case of arranging the member 500, there may be no insulating housing mounting hole 340 in the insulating housing 300. The connecting members, such as the bolt 610 and the nut 620, may connect the member 500 to the circuit board 800 together to clamp the insulating housing 300.

In some embodiments, the electronic system 700 may include a circuit board stiffener 830. The circuit board stiffener 830 may be fixed to the card edge connector 100. The circuit board 800 may be clamped between the card edge connector 100 and the circuit board stiffener 830. In some embodiments, a circuit board stiffener mounting hole 840 may be formed in the circuit board stiffener 830. The circuit board stiffener mounting hole 840 may be aligned with the insulating housing mounting hole 340. The bolt 610 may extend through the insulating housing mounting hole 340, the circuit board mounting hole 820 and the circuit board stiffener mounting hole 840, and be connected to the nut 620. Therefore, the connecting members, such as the bolt 610 and the nut 620, may be used for clamping the insulating housing 300, the circuit board 800 and the circuit board stiffener 830 to achieve pressure mount of the mounting ends 420 to the contact pads 810 on the circuit board 800. It should be noted that in the case of arranging the member 500 without any insulating housing mounting hole 340 in the insulating housing 300, the connecting members, such as the bolt 610 and the nut 620, may connect the member 500, the circuit board 800 and the circuit board stiffener 830 together to clamp the insulating housing 300.

The circuit board stiffener 830 may be made of the material with relatively larger strength, for example, the plastics, the ceramics, the metal and the like. In some embodiments, the circuit board stiffener 830 is an integral sheet metal part. Therefore, the circuit board stiffener 830 is relatively higher in strength, simpler in processing process and relatively lower in cost.

Arranging the circuit board stiffener 830 may reduce the risk of the warpage of the circuit board 800 due to the pressures between the mounting ends 420 and the circuit board 800. In some embodiments, if the structure strength of the circuit board 800 is high enough, there may be no need for arranging the circuit board stiffener 830.

In some embodiments, the member 500 may include a cover plate 520. The cover plate 520 may cover the mating surface 301. The slot 510 may be formed in the cover plate 520. Therefore, force afforded by the insulating housing 300 may be more uniform, which makes the insulating housing 300 durable. Additionally, the cover plate 520 may serve as a protective cap, blocking ingress of dust, moisture, etc. from entering the insulating housing 300 through the mating surface 301.

Figure 6:
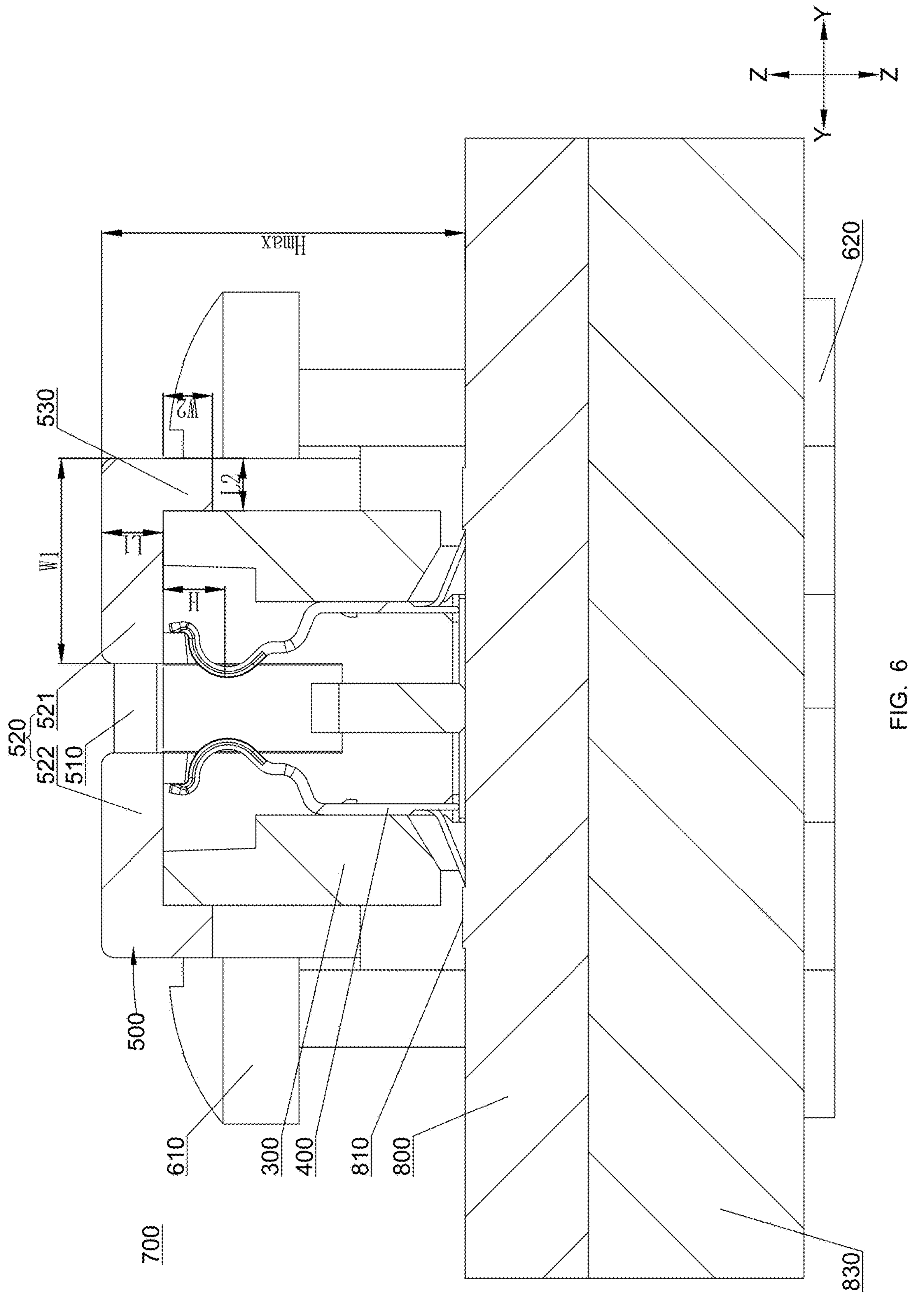
FIG. 6 is a cross-sectional side view of the electronic system of FIG. 3.

In some embodiments, a flange 530, extending toward the mounting surface 302, may be arranged at the side edge of the cover plate 520. The flange 530 may abut against the side surface of the insulating housing 300. With reference to FIGS. 5-6, a cross section of the member 500 is in an L shape. The cross section is formed by sectioning the member 500 by a plane perpendicular to the longitudinal direction X-X. With the flange 530, the member 500 may be positioned conveniently. Also, the flange 530 may further have an effect on protecting the side surface of the insulating housing 300 from deforming or cracking.

In some embodiments, depending on required signal integrity and the member material, the member 500 may be grounded or not. In some embodiments, the member 500 may be made of metal, which may deteriorate the signal integrity performance if float. Then connecting the stiffener to ground may improve the signal integrity performance. In some embodiments, the member 500 may be made of a different material and/or have a better structure. For example, the member 500 may be made of a high-strength non-metallic material, the member 500 may be not necessary to be grounded.

In some embodiments, the cover plate 520 and the flange 530 may be sized to provide the desired signal integrity and the desired robustness. In some embodiments, the size of the cover plate 520 may include a width W1 and a thickness L1, and the size of the flange 530 may include a width W2 and a thickness L2. The above sizes may be adjusted according to the desired signal integrity and the desired robustness, so as to meet the user demand. In some embodiments, when better robustness is required, the sizes of the cover plate 520 and the flange 530 may be increased, so that the member 500 may have higher mechanical strength; and when better signal integrity is required, the sizes of the cover plate 520 and the flange 530 may be reduced.

In some embodiments, a tower opening 540 may be formed in an end of the cover plate 520. The tower opening 540 may communicate with the slot 510. The tower opening 540 may be in correspondence to the tower 320. The tower 320 may extend through the tower opening 540. The flange 530 may extend to the side surface of the tower 320. Therefore, the flange 530 may further have the effect of protection on the side surface of the tower 320, so as to prevent the insulating housing 300 from deforming or cracking.

In some embodiments, a stiffener mounting hole 550 may be formed in the member 500. The stiffener mounting hole 550 may be aligned with the insulating housing mounting hole 340 formed in the insulating housing 300. Therefore, the bolt 610 may extend through the stiffener mounting hole 550 and the insulating housing mounting hole 340, and then be connected to the nut 620.

Figure 12:
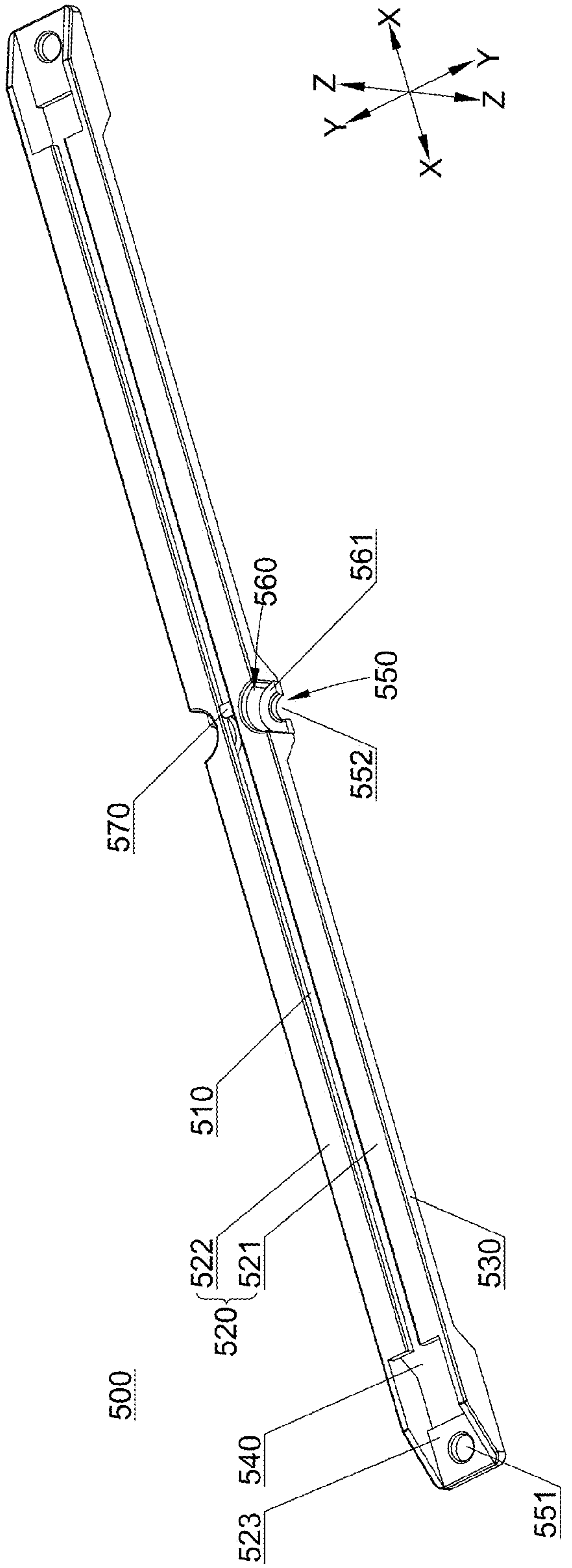
FIG. 12 is a perspective view of a member of the electronic system of FIG. 3.

In some embodiments, as shown in FIG. 12, the cover plate 520 may include a first sub-cover plate 521 and a second sub-cover plate 522. The first sub-cover plate 521 and the second sub-cover plate 522 may be separately arranged. In some embodiments, the first sub-cover plate 521 and the second sub-cover plate 522 may be spaced apart from each other in the transverse direction Y-Y, so as to form the tower opening 540 and the slot 510. The first sub-cover plate 521 and the second sub-cover plate 522 at the tower 320 may be separated by a larger distance at ends, so as to form the tower openings 540. The first sub-cover plate 521 and the second sub-cover plate 522 may be symmetrically arranged. The first sub-cover plate 521 and the second sub-cover plate 522 may be mounted on the insulating housing 300. The first sub-cover plate 521 and the second sub-cover plate 522 may apply pressure to the insulating housing 300, such that the mounting ends 420 may pressure mount to the contact pads 810 on the circuit board 800. With such arrangement, the cover plate 520 may be simple and concise in structure and low in manufacturing cost.

In some embodiments, as shown in FIG. 12, the cover plate 520 may include an end plate 523. The end plate 523 may be connected, in the longitudinal direction X-X, between the first sub-cover plate 521 and the second sub-cover plate 522 at the outer side of the tower 320. The first sub-cover plate 521 and the second sub-cover plate 522 may be integrally arranged through the end plate 523. In some embodiments, the first sub-cover plate 521, the second sub-cover plate 522 and the end plate 523 may be integrally formed by cutting and folding a sheet of metal or by molding, etc., or may be connected by welding, etc. The stiffener mounting hole 550 may include a first stiffener mounting hole 551 formed in the end plate 523. The first stiffener mounting hole 551 may be aligned with the first insulating housing mounting hole 341 (if provided). Accordingly, for example, the connecting member such as the bolt 610 may extend through the first stiffener mounting hole 551 and the first insulating housing mounting hole 341 and be connected to the nut 620, or may be directly in threaded connection with the first stiffener mounting hole 551 and the first insulating housing mounting hole 341. The cover plate 520 with such arrangement may be higher in mechanical strength and more convenient and rapid to be mounted.

In some embodiments, the end plate 523 may be closer to the mounting surface 302 than the mating surface 301. Such a configuration may reduce a length of the bolt 610 and therefore lower the cost. Also, the stability of connection between the bolt 610 and the nut 620 may be improved.

In some embodiments, the insulating housing 300 may be of an elongated structure. The stiffener mounting hole 550 may include second stiffener mounting holes 552; and the second stiffener mounting holes 552 may be formed on the sides, extending in the longitudinal direction X-X, of the member 500. In some embodiments, the second stiffener mounting holes 552 may be aligned with the second insulating housing mounting holes 342 (if provided). Accordingly, for example, the connecting members such as the bolts 610 may penetrate through the second stiffener mounting holes 552 and the second insulating housing mounting holes 342 and then be connected to the nuts 620, or may be directly in threaded connection with the second stiffener mounting holes 552 and the second insulating housing mounting holes 342. With such arrangement, pressure may be applied to the insulating housing 300 from a plurality of positions, so as to prevent the warpage of the insulating housing 300 and/or the circuit board 800.

In some embodiments, each of the second stiffener mounting holes 552 may be half hole. In a cross section of the half hole, the half hole communicates in the transverse direction Y-Y with the external. The cross section of the half hole refers to a cross section perpendicular to the vertical direction Z-Z. In some embodiments, the cross section of the half hole may be in a semicircular shape. The straight edge of the semicircle may face the outside. The half hole may communicate with the external through one side, on which the straight edge is located. In other embodiments (not shown), the half hole may further be in any other shape; and the shape of the half hole may depend on the shape and the structure of the used connecting member. Similar to the beneficial effects of employing a half hole as the second insulating housing mounting hole 342, the half hole with relatively larger diameter may be arranged in a limited space of the member 500, and then a relatively larger connecting member may be used to connect the card edge connector having the member 500 to the circuit board, so as to lower the difficulty of a connecting operation. Moreover, it possibly provides a condition for the second stiffener mounting holes 552 formed in the two adjacent members 500 to form a through hole.

In some embodiments, the second stiffener mounting hole 552 may be configured to form a through hole with a second stiffener mounting hole 552 formed in a member 500 of an adjacent card edge connector 100 to share a same connecting member. As the electronic system becomes more and more compact and the intensive degree becomes higher and higher, a plurality of card edge connectors with pressure mount are connected to one circuit board in the transverse direction Y-Y one by one, that is, two adjacent card edge connectors with pressure mount may be disposed very close to each other, with reference to FIGS. 14-15. With such arrangement, the adjacent card edge connectors 100 may be fixed to the circuit board 800 by connecting their members 500 to the circuit board 800 with a common connecting member. Therefore, less connecting members may be used to connect more card edge connectors 100. Moreover, when a large number of card edge connectors are connected to the circuit board 800, the number of steps of a connecting operation may be reduced, and then the cost of the electronic system employing the card edge connectors is lowered.

In some embodiments, a stiffener recess 560 may be arranged on the side, extending in the longitudinal direction X-X, of the insulating housing 300. A hole seat 561, adjacent to the mounting surface 302, may be formed inside the stiffener recess 560. The second stiffener mounting hole 552 may be formed in the hole seat 561. With such arrangement, the member 500 may be simple and concise in structure and low in manufacturing cost.

Examples of the conductive elements 400 are described in detail below.

As shown in FIGS. 11A-11B, a intermediate portion 430 may be arranged between the mounting end 420 and the mating end 410 of each conductive element 400. A thickness D1 of the intermediate portion 430 may be greater than a thickness D2 of the mounting end 420. For example, D1 may approximately be 0.20 mm, and D2 may approximately be 0.10 mm, or D1 may approximately be 0.18 mm, and D2 may approximately be 0.10 mm, etc. D2 may be sized according to desired pressure. Reduction in D2 may reduce a compression force required to pressure mount the mounting end 420, which may reduce the risk of deforming the mounting end 420 and the contact pad. Also, shortening a pressing path of the mounting end 420 lowers the impedance of the mounting end 420. Relatively lower pressure may prevent the insulating housing 300 and/or the circuit board 800 from warpage. In some embodiments, an electroplated gold layer, an electroplated tin layer or any other suitable plating layer may be arranged on the surface of the mounting end 420, which may lower the impedance between the mounting end 420 and the corresponding contact pad 810 on the circuit board 800. Similarly, an electroplated gold layer, an electroplated tin layer or any other suitable plating layer may be arranged on the surface of the contact pad 810 on the circuit board 800. In some embodiments, a thickness of the mounting end 420 may also be less than that of the mating end 410. Optionally, the mating end 410 may have a similar thickness to the intermediate portion 430. Optionally, an electroplated gold layer, an electroplated tin layer or any other suitable plating layer may be formed on a contact region 413 of each mating end 410.

In some embodiments, the intermediate portion 430 may be fixed to the insulating housing 300 through clamping or any other suitable manner. The mating end 410 may include a V-shaped portion 411 and a U-shaped portion 412. One end of the V-shaped portion 411 may be connected to the intermediate portion 430. The central part of the V-shaped portion 411 may protrude toward the card slot 330. The other end of the V-shaped portion 411 may be connected to an end of the U-shaped portion 412 at the inner side of the intermediate portion 430. A bend of the U-shaped portion 412 may be located in the card slot 330. The bend of the U-shaped portion 412 may form the corresponding contact region 413. The contact region 413 may be used for electrically contact the golden finger 910 of the electronic card 900. Such a configuration may enable a smaller friction force between the conductive element 400 and the electronic card 900, so that abrasion on both of the conductive element 400 and the electronic card 900 are small in use, and then the service lives thereof are prolonged.

In some embodiments, the mounting end 420 may obliquely extend toward an outer side of the insulating housing 300. Such a configuration may enable, when the mounting end 420 presses on the corresponding contact pad 810, a larger contact area between the mounting end 420 and the contact pad 810, so that the connection reliability is ensured, and the impedance is lowered. Also, the intensity of pressure may further be weakened, and damages are prevented.

In some embodiments, a tip 440 may be connected to the end of the mating end 410. The tip 440 may be limited in the mounting groove 396 for the conductive element 400 with this the tip 440. In some embodiments, the tip 440 may be hooked on the wall of the corresponding mounting groove 396. Therefore, a fixing between the conductive element 400 and the insulating housing 300 is relatively simpler and more concise in structure and is lower in manufacturing cost. Also, the conductive element 400 and the insulating housing 300 are convenient to be mounted together, so that the assembling difficulty of the production may be reduced.

In some embodiments, the mating end 410 may have the contact region 413 bending into the card slot 330, with reference to FIG. 6 and FIGS. 11A-11B. The tip 440 may be configured to be short enough that a distance H between the contact region 413 and the opening of the card slot 330 is less than a preset distance. For example, a maximum housing interface height Hmax may be approximately 3.90 cm. In the case that the maximum housing interface height Hmax is limited, the distance H between each contact region 413 and the opening of the card slot 330 may be set to be smaller, for example, less than 1.5 cm, which may be achieved by shortening the corresponding tip 440. When the distance H between each contact region 413 and the opening of the card slot 330 is small enough, a stronger member 500 may be mounted, for example, a thickness L1 of the cover plate 520 may be set to be larger. The cover plate 520 may be configured with an irregular shape. Compared with the above regular shape, the irregular-shaped cover plate 520 may avoid a high-speed signal conductor pair to reduce crosstalk caused by the metal cover plate, and thus the signal integrity may be improved. The thicker member 500 may provide better robustness. In some embodiments, the member 500 may be made of metal and has the thickness of about 1 mm. A height of the conductive element 400 may correspondingly be reduced by 1 mm. Shorter contact region may enable stronger stiffer and also improve signal integrity.

The present disclosure has been described through the above embodiments, but it should be understood that a variety of variations, modifications and improvements may be made by a person skilled in the art according to the teaching of the present disclosure, and these variations, modifications and improvements all fall within the spirit of the present disclosure and the claimed scope of protection of the present disclosure. The scope of protection of the present disclosure is defined by the appended claims and its equivalent scope. The above embodiments are only for the purpose of illustration and description, and are not intended to limit the present disclosure to the scope of the described embodiments.

Moreover, although many creative aspects have been described above with reference to the vertical connector, it should be understood that the aspects of the present disclosure are not limited to these. Any one of the creative features, whether alone or combined with one or more other creative features, can also be used for other types of card edge connectors, such as right-angle connectors and coplanar connectors, and the like.

In the description of the present disclosure, it is to be understood that orientation or positional relationships indicated by orientation words "front', "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include any suitable orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, it should also be understood that when the terms "including" and/or "comprising" are used herein, it indicates the presence of features, steps, operations, parts, components and/or combinations thereof.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. An electrical connector, comprising:

a housing comprising a mating surface, a mounting surface separated from the mating surface in a vertical direction, and a slot extending through the mating surface and elongated in a longitudinal direction perpendicular to the vertical direction; and a plurality of conductive elements held in the housing, each of the plurality of conductive elements comprising:

a mating end curving into the slot, a mounting end extending out of the mounting surface and configured for pressure mount, and an intermediate portion joining the mating end and the mounting end, wherein, for each of the plurality of conductive elements:

the mounting end extends from the intermediate portion at an angle to the vertical direction; and the angle is greater than zero degrees and less than ninety degrees, wherein the housing comprises a pair of towers disposed at opposite ends of the slot and a pair of latches pivotably attached to respective ones of the pair of towers.

2. The electrical connector of claim 1, wherein, for each of the plurality of conductive elements:

the mounting end is thinner and/or narrower than the intermediate portion.

3. The electrical connector of claim 1, wherein, for each of the plurality of conductive elements:

the mounting end is thinner than the mating end.

4. The electrical connector of claim 1, wherein, for each of the plurality of conductive elements:

the mating end comprises a first curved portion and a second curved portion;

the first curved portion joins the second curved portion and the intermediate portion; and the second curved portion comprises a mating contact region in the slot.

5. The electrical connector of claim 1, wherein:

for each of the plurality of conductive elements, the mounting end is thinner and narrower than the intermediate portion.

6. The electrical connector of claim 1, wherein:

each of the pair of towers comprises a lug extending outwards of the slot and comprising a mounting hole extending therethrough.

7. The electrical connector of claim 6, wherein:

the housing comprises another mounting hole disposed between the pair of towers.

8. The electrical connector of claim 1, wherein:

the housing comprises one or more mounting holes; and the electrical connector comprises a member comprising one or more mounting holes aligned with respective ones of the one or more mounting holes of the housing.

9. The electrical connector of claim 8, wherein:

the member comprises a pair of openings; and the housing comprises a pair of towers disposed at opposite ends of the slot and extending through respective ones of the pair of openings and in the vertical direction.

10. An electrical connector, comprising:

a housing comprising:

a mating surface, a mounting surface separated from the mating surface in a vertical direction, a slot extending through the mating surface and elongated in a longitudinal direction perpendicular to the vertical direction, and one or more mounting holes;

a plurality of conductive elements held in the housing, each of the plurality of conductive elements comprising a mating end curving into the slot and a mounting end extending out of the mounting surface; and a member at least partially disposed on the housing and comprising:

a slot aligned with the slot of the housing, and one or more mounting holes aligned with respective ones of the one or more mounting holes of the housing, wherein:

the member comprises a pair of openings; and the housing comprises a pair of towers disposed at opposite ends of the slot and extending through respective ones of the pair of openings and in the vertical direction.

11. The electrical connector of claim 10, wherein:

the one or more mounting holes of the member comprise a first mounting hole disposed outside the pair of towers and a second mounting hole disposed between the pair of towers.

12. The electrical connector of claim 10, wherein:

the member comprises material stronger than material of the housing.

13. The electrical connector of claim 10, wherein, for each of the plurality of conductive elements:

the mounting end extends from an intermediate portion at an angle to the vertical direction; and the angle is greater than zero degrees and less than ninety degrees.

14. The electrical connector of claim 13, wherein:

the mounting end comprises a contact surface perpendicular to the vertical direction.

15. The electrical connector of claim 14, wherein:

the contact surface comprises a conductive layer.

16. The electrical connector of claim 10, wherein:

the member comprises a first portion disposed on the mating surface; and the first portion of the member comprises the slot of the member.

17. The electrical connector of claim 16, wherein:

the member comprises a second portion extending from the first portion and in the vertical direction.

18. An electronic system, comprising:

a printed circuit board comprising a memory bus;

a first electrical connector electrically coupled to the memory bus;

a second electrical connector disposed next to the first electrical connector and electrically coupled to the memory bus; and a connecting member holding both the first electrical connector and the second electrical connector to the printed circuit board, wherein:

the connecting member extends through a hole;

the first electrical connector comprises a first housing comprising a first portion of the hole; and the second electrical connector comprises a second housing comprising a second portion of the hole.

19. The electronic system of claim 18, wherein:

the first electrical connector comprises a first housing and a first member at least partially disposed on the first housing; and the connecting member holds the first member of the first electrical connector to the printed circuit board.

20. The electronic system of claim 19, wherein:

the second electrical connector comprises a second housing and a second member at least partially disposed on the second housing; and the connecting member holds the second member of the second electrical connector to the printed circuit board.

* * * * *